US008244552B2

(12) United States Patent
Firminger et al.

(10) Patent No.: US 8,244,552 B2
(45) Date of Patent: *Aug. 14, 2012

(54) TEMPLATE DEVELOPMENT BASED ON SENSOR ORIGINATED REPORTED ASPECTS

(75) Inventors: Shawn P. Firminger, Redmond, WA (US); Jason Garms, Redmond, WA (US); Roderick A. Hyde, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC ( * ) Notice: Subject to any disclaimer, the term of this patent is extended or adjusted under 35 U.S.C. 154(b) by 272 days.

This patent is subject to a terminal disclaimer.

(21) Appl. No.: 12/592,944

(22) Filed: Dec. 3, 2009

(65) Prior Publication Data
US 2011/0055097 A1 Mar. 3, 2011

Related U.S. Application Data

(63) Continuation-in-part of application No. 12/590,841, filed on Nov. 12, 2009, and a continuation-in-part of application No. 12/592,075, filed on Nov. 17, 2009, and a continuation-in-part of application No. 12/592,161, filed on Nov. 18, 2009, and a continuation-in-part of application No. 12/592,544, filed on Nov. 24, 2009, and a continuation-in-part of application No. 12/592,548, filed on Nov. 25, 2009, and a continuation-in-part of application No. 12/584,489, filed on Sep. 3, 2009, and a continuation-in-part of application No. 12/587,018, filed on Sep. 29, 2009, and a continuation-in-part of application No. 12/587,127, filed on Sep. 30, 2009, and a continuation-in-part of application No. 12/590,027, filed on Oct. 29, 2009, and a continuation-in-part of application No. 12/590,039, filed on Oct. 30, 2009, and a continuation-in-part of application No. 12/590,600, filed on Nov. 10, 2009.

(51) Int. Cl.
G06Q 10/00 (2012.01)
(52) U.S. Cl. ...................................................... 705/1.1
(58) Field of Classification Search ........................ None
See application file for complete search history.

(56) References Cited

U.S. PATENT DOCUMENTS
4,853,854 A 8/1989 Behar et al.
(Continued)

OTHER PUBLICATIONS

Agger, Michael;"Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

(Continued)

Primary Examiner — Jonathan Ouellette

(57) ABSTRACT

A computationally implemented method includes, but is not limited to: providing one or more reported aspects associated with one or more source users that were originally reported by one or more sensors; and developing one or more templates designed to facilitate one or more end users to achieve one or more target outcomes when one or more emulatable aspects indicated by the one or more templates are emulated, the development of the one or more templates being based at least on a portion of the one or more reported aspects In addition to the foregoing, other method aspects are described in the claims, drawings, and text forming a part of the present disclosure.

43 Claims, 19 Drawing Sheets

U.S. PATENT DOCUMENTS

| | | | |
|---|---|---|---|
| 5,961,446 | A | 10/1999 | Beller et al. |
| 6,338,044 | B1 | 1/2002 | Cook et al. |
| 6,353,447 | B1 | 3/2002 | Truluck et al. |
| 6,842,604 | B1 | 1/2005 | Cook et al. |
| 7,587,368 | B2 | 9/2009 | Felsher |
| 7,668,735 | B2 | 2/2010 | Grace et al. |
| 7,702,685 | B2 | 4/2010 | Shrufi et al. |
| 7,860,852 | B2 | 12/2010 | Brunner et al. |
| 7,908,182 | B1 | 3/2011 | Gupta |
| 7,959,567 | B2 | 6/2011 | Stivoric et al. |
| 8,005,906 | B2 | 8/2011 | Hayashi et al. |
| 2002/0107707 | A1 | 8/2002 | Naparstek et al. |
| 2004/0015337 | A1* | 1/2004 | Thomas et al. ............... 703/11 |
| 2005/0197553 | A1 | 9/2005 | Cooper |
| 2005/0216300 | A1 | 9/2005 | Appelman et al. |
| 2006/0036619 | A1* | 2/2006 | Fuerst et al. ............... 707/100 |
| 2007/0088576 | A1 | 4/2007 | de Beus et al. |
| 2008/0091471 | A1 | 4/2008 | Michon et al. |
| 2008/0288425 | A1* | 11/2008 | Posse et al. ............... 706/12 |
| 2008/0294012 | A1* | 11/2008 | Kurtz et al. ............... 600/300 |
| 2009/0044113 | A1 | 2/2009 | Jones et al. |
| 2009/0070679 | A1 | 3/2009 | Shen et al. |
| 2009/0075242 | A1 | 3/2009 | Schwarzberg et al. |
| 2009/0076335 | A1 | 3/2009 | Schwarzberg et al. |
| 2009/0100469 | A1 | 4/2009 | Conradt et al. |
| 2009/0176526 | A1* | 7/2009 | Altman ............... 455/556.1 |
| 2009/0258710 | A1* | 10/2009 | Quatrochi et al. ............... 463/43 |
| 2009/0271247 | A1 | 10/2009 | Karelin et al. |
| 2009/0292814 | A1 | 11/2009 | Ting et al. |
| 2009/0299990 | A1* | 12/2009 | Setlur et al. ............... 707/5 |
| 2009/0313041 | A1* | 12/2009 | Eder ............... 705/2 |
| 2009/0319288 | A1 | 12/2009 | Slaney et al. |
| 2009/0326981 | A1* | 12/2009 | Karkanias et al. ............... 705/3 |
| 2010/0063993 | A1* | 3/2010 | Higgins et al. ............... 709/203 |
| 2010/0114788 | A1 | 5/2010 | White et al. |
| 2010/0268830 | A1 | 10/2010 | McKee et al. |
| 2010/0281364 | A1* | 11/2010 | Sidman ............... 715/713 |
| 2010/0293247 | A1 | 11/2010 | McKee et al. |
| 2010/0305806 | A1* | 12/2010 | Hawley ............... 701/33 |
| 2011/0022602 | A1 | 1/2011 | Luo et al. |
| 2011/0179161 | A1 | 7/2011 | Guy et al. |
| 2011/0185020 | A1 | 7/2011 | Ramamurthy et al. |
| 2011/0252101 | A1* | 10/2011 | Davis et al. ............... 709/206 |

OTHER PUBLICATIONS

"Self-tracking links to get you started"; The Quantified Self: self knowledge through numbers; printed on Dec. 10, 2010; pp. 1-5; located at: http://quantifiedself.com/self-tracking-links-to-get-you-started/.

U.S. Appl. No. 12/655,582, Firminger et al.
U.S. Appl. No. 12/655,581, Firminger et al.
U.S. Appl. No. 12/655,365, Firminger et al.
U.S. Appl. No. 12/655,250, Firminger et al.
U.S. Appl. No. 12/655,075, Firminger et al.
U.S. Appl. No. 12/653,972, Firminger et al.
U.S. Appl. No. 12/653,387, Firminger et al.
U.S. Appl. No. 12/653,386, Firminger et al.
U.S. Appl. No. 12/653,180, Firminger et al.
U.S. Appl. No. 12/653,117, Firminger et al.
U.S. Appl. No. 12/592,946, Firminger et al.
U.S. Appl. No. 12/592,548, Firminger et al.
U.S. Appl. No. 12/592,544, Firminger et al.
U.S. Appl. No. 12/592,161, Firminger et al.
U.S. Appl. No. 12/592,075, Firminger et al.
U.S. Appl. No. 12/590,841, Firminger et al.
U.S. Appl. No. 12/590,600, Firminger et al.
U.S. Appl. No. 12/590,039, Firminger et al.
U.S. Appl. No. 12/590,027, Firminger et al.
U.S. Appl. No. 12/587,127, Firminger et al.
U.S. Appl. No. 12/587,018, Firminger et al.
U.S. Appl. No. 12/584,653, Firminger et al.
U.S. Appl. No. 12/584,489, Firminger et al.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-remembered-as-the...; printed on Nov. 25, 2009.

"Exercise Pro Software Active Care Version 5"; BioEX Systems, Inc.; bearing dates of 1995-2009; pp. 1-4; located at http://www.bioexsystems.com/ActiveCare.htm; printed on Dec. 17, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919...; printed on Nov. 25, 2009.

Guez, Tomer; "Weight Loss Software, Food Diary, Exercise Tracker, and Medical Diary. 'The Food and Exercise Diary Software Version 6.0'"; bearing a date of Sep. 2009; pp. 1-17; located at http://www.weightlosssoftware.com/?ti=135&wn=2; printed on Dec. 17, 2009.

"Nutrition tracking software is critical for learning about foods and planning meals"; NutriCoach; bearing a date of Mar. 29, 2006; 6 total pgs.; located at http://www.nutricoach.net/diet_software.html; printed on Dec. 17, 2009.

"Nutritionmaker Focus Nutrition Software Motivate—Analyze—Instruct"; BioEX Systems, Inc.; bearing dates of 1995-2009; pp. 1-4; located at http://www.bioexsystems.com/NutritionMakerChiro.htm; printed on Dec. 17, 2009.

"Tired of a stiff neck and shoulders? Ergo Pro Computer Fatigue Software reminds you when to stretch and shows you how"; BioEX Systems, Inc.; bearing dates of 1995-2009; pp. 1-3; located at http://www.bioexsystems.com/ExerciseBreak.htm; printed on Dec. 17, 2009.

"VHI PC-Kits Desktop Edition"; Visual Health Information; pp. 1-2; located at http://www.vhikits.com/products/software/PCKitsDesktop.aspx; printed on Dec. 17, 2009.

Chen, Jason; "You Can Soon Track Your Heart Rate with Your iPhone"; Gizmodo; Bearing a date of Oct. 9, 2009; p. 1; Creative Commons License; located at: http://gizmodo.com/5378340/you-can-soon-track-your-heart-rate-with-your-iphone; printed on Oct. 29, 2009.

"Fitbit"; Bearing a date of 2009; pp. 1-2; Fitbit, Inc.; located at: http://www.fitbit.com; printed on Oct. 29, 2009.

"Free Exercise Programs—Workout Routines & Weight Loss Diet Plans"; Freetrainers.com; Bearing dates of 2000-2008; pp. 1-2; located at: http://www.freetrainers.com/FT/jsp/index.jsp; printed on Sep. 2, 2009.

Wilson, Mark; "Philips DirectLife Turns Exercise Into a Status Bar"; Gizmodo; Bearing a date of Oct. 21, 2009; pp. 1-2; Creative Commons License; located at: http://gizmodo.com/5386577/philips-directlife-turns-exercise-into-a-status-bar; printed on Oct. 29, 2009.

"Your Personalized Development Plan"; Central Michigan University; Bearing a date of 2004; p. 1; located at: http://www.chsbs.cmich.edu/leader_model/dplanintro.htm; printed on Sep. 2, 2009.

Gaonkar, Shravan, et al.; "Micro-Blog: Sharing and Querying Content Through Mobile Phones and Social Participation"; MobiSys '08; Jun. 17-20, 2008; pp. 174-186; ACM.

* cited by examiner

TEMPLATE DEVELOPMENT BASED ON SENSOR ORIGINATED REPORTED ASPECTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/584,489, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/584,653, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 8 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,018, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,127, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,027, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,039, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,600, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 10 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,841, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 12 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,075, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 17 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,161, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 18 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,544, entitled IDENTIFICATION AND PROVISION OF REPORTED ASPECTS THAT ARE RELEVANT WITH RESPECT TO ACHIEVEMENT OF TARGET OUTCOMES, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 24 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,548, entitled IDENTIFICATION AND PROVISION OF REPORTED ASPECTS THAT ARE RELEVANT WITH RESPECT TO ACHIEVEMENT OF TARGET OUTCOMES, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 25 Nov. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to providing one or more reported aspects associated with one or more source users that were originally reported by one or more sensors; and developing one or more templates designed to facilitate one or more end users to achieve one or more target outcomes when one or more emulatable aspects indicated by the one or more templates are emulated, the development of the one or more templates being based at least on a portion of the one or more reported aspects. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for providing one or more reported aspects associated with one or more source users that were originally reported by one or more sensors; and means for developing one or more templates designed to facilitate one or more end users to achieve one or more target outcomes when one or more emulatable aspects indicated by the one or more templates are emulated, the development of the one or more templates being based at least on a portion of the one or more reported aspects. In addition to the foregoing, other system aspects are described in the claims, drawings, and text forming a part of the present disclosure.

A computationally implemented system includes, but is not limited to: circuitry for providing one or more reported aspects associated with one or more source users that were originally reported by one or more sensors; and circuitry for developing one or more templates designed to facilitate one or more end users to achieve one or more target outcomes when one or more emulatable aspects indicated by the one or more templates are emulated, the development of the one or more templates being based at least on a portion of the one or more reported aspects. In addition to the foregoing, other system aspects are described in the claims, drawings, and text forming a part of the present disclosure.

A computer program product including a signal-bearing medium bearing one or more instructions for providing one or more reported aspects associated with one or more source users that were originally reported by one or more sensors; and one or more instructions for developing one or more templates designed to facilitate one or more end users to achieve one or more target outcomes when one or more emulatable aspects indicated by the one or more templates are emulated, the development of the one or more templates being based at least on a portion of the one or more reported aspects. In addition to the foregoing, other computer program product aspects are described in the claims, drawings, and text forming a part of the present disclosure.

A method for providing relevant reported aspects that are relevant to achieving one or more target outcomes, the method includes providing, using a processor, one or more reported aspects associated with one or more source users that were originally reported by one or more sensors; and developing one or more templates designed to facilitate one or more end users to achieve one or more target outcomes when one or more emulatable aspects indicated by the one or more templates are emulated, the development of the one or more templates being based at least on a portion of the one or more reported aspects.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
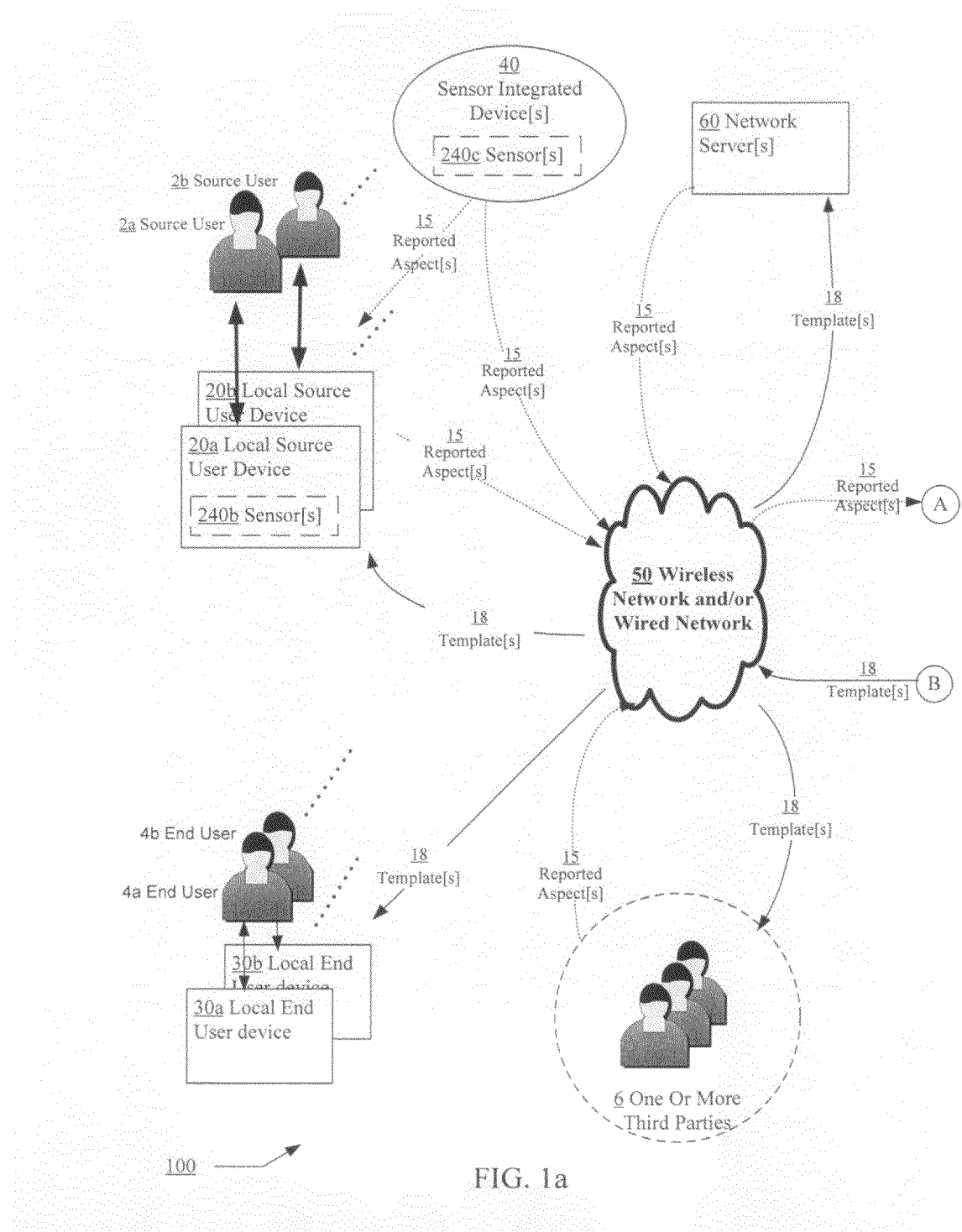
FIGS. 1a and 1b show a high-level block diagram of a Computing Device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that has enjoyed explosive popularity in the computing/communication field is to electronically record one's everyday activities, behaviors, thoughts, beliefs, traits, physical or mental states, physical characteristics, and other aspects of the person's everyday life onto an open journal. One place where such open journals are maintained is at social networking sites commonly known as "blogs" where one or more users may report or post every aspect of their daily lives. In brief, an "aspect," as will be referred to herein, may be in reference to any act, behavior, characteristic, user state or status, belief, and so forth, that may be associated with a user (e.g., a person including, for example, a network user such as a blogger or a social networking user). The process of reporting or posting blog entries is commonly referred to as "blogging." A newer type of blogging that has become very popular in recent times is microblogging, otherwise known as "twittering" or "tweeting." In microblogging, each of the microblogs that are posted are typically relatively short posts or entries, usually not more than 140 characters long.

Other types of social networking sites may also allow users to maintain open journals and to allow users to easily update their personal information in real time. Such updates are typically made via, for example, social networking status reports otherwise known simply as "status reports." These social networking sites allow a user to report or post for others to view the latest status or other aspects related to the user.

Another recent tread in social networking is to employ one or more sensors to detect and report on a wide variety of user aspects (i.e., aspects of a user). Examples of sensors that may be used for such purposes vary widely, ranging from well-known devices that can detect and report on various physiological parameters such as heart rate or blood pressure, to sensors that can detect certain user behaviors or activities such as toilet usage. Examples of sensors that may be employed in order to monitor or detect user activities include, for example, accelerometers, pedometers, global positioning systems or GPSs, and so forth. Such devices are already, in fact, being integrated into mobile computing/communication devices such as cellular telephones and smart phones.

Other types of sensors are also being integrated into mobile computing/communication devices such as those that monitor environmental conditions. Examples of such sensors include, for example, those that can measure atmospheric conditions such as air quality levels.

There are also other types of sensors that have traditionally been too large to carry around that are now becoming increasingly more compact and more portable for personal use. These include, for example, sensors that can monitor and detect various physiological characteristics of users including those that can, individually or in combination, collect physiological data that may be used in order to determine the inferred mental states (or simply "mental states") of users. Examples of such sensors include, for example, functional near-infrared (fNIR) devices, functional magnetic resonance imaging (fMRI) devices, electroencephalography (EEG) devices, magnetoencephalography (MEG) devices, galvanic skin sensor devices, and so forth.

Other sensors may be integrated into user devices such as automobiles, exercise machines, household appliances, and so forth that may be employed in order to detect and monitor their usage. There are also sensors that are currently available that can even monitor bathroom or toilet usage. All the above described sensors may be configured to provide their collected data through log entries such as entries made through social networking channels (e.g., microblogs).

Although a wealth of personal information provided through log entries (e.g., microblogs, status reports, and so forth) are now available through these social networking sites, it is only recently has there been any effort to exploit such potentially useful data. As blogs, microblogs, and various social networking sites become increasingly popular, personal data collected through such means may be spread across multiple network sites making it even more difficult to exploit such potentially useful data.

In various embodiments, methods, systems, circuitry, and computer program products are provided for developing one or more templates that may facilitate one or more end users in achieving one or target outcomes when one or more emulatable aspects included in the one or more templates are emulated. More particularly, the methods, systems, circuitry, and computer program products may be designed to develop the one or more templates based, at least in part, on one or more reported aspects of one or more "source users" that were at least originally reported by one or more sensors. In some embodiments, the one or more templates may be developed based on reported aspects that are reported by one or more sensors and one or more source users.

As briefly described above, in order to develop the one or more templates, one or more reported aspects that were at least originally reported by one or more sensors may at least initially be provided. In some cases, the providing of the one or more reported aspects that were originally reported by one or more sensors may involve acquiring or retrieving of such reported aspects from, for example, a wireless network, a wired network, and/or a memory. In some embodiments, the methods, systems, circuitry, and computer program products may be implemented by a variety of computing/communication devices including, for example, a network device such as a server (e.g., network servers) or a local client device (e.g., a source user device or an end user device).

As previously indicated, the one or more reported aspects that are provided by the methods, systems, circuitry, and computer program products may be used in order to develop one or more templates. A "template" is a plan or a schedule that is designed to facilitate the achievement of one or more target outcomes when one or more emulatable aspects included in the template are emulated. The one or more emulatable aspects that may be included in the template may correspond to the one or more reported aspects that were provided and that were originally reported by one or more sensors.

In the discussion to follow below, a "personalized plan" is a particular type of template that has personalized for a particular end user. For example, a personalized plan may be developed by taking a generic template and modifying the generic template (e.g., modifying or replacing the emulatable aspects that may be included in the generic template) such that the modified generic template (e.g., personalized plan) meets or satisfies logistical or physical limitations of the end user. An example of a personalized plan (or a template) is a personalized plan (or a template) that is developed based on reported aspects of a source user that facilitates an end user to achieve a desired outcome such as weight loss, achieving a high score on the scholastic aptitude test (SAT).

A template may merely indicate a collection of activities (e.g., emulatable aspects) or may indicate a more precise schedule of activities (e.g., emulatable aspects) that an end user may emulate in order to achieve a target outcome or outcome. For example, if a template is designed to facilitate an end user to lose weight, it may include a schedule of when and what activities (e.g., go jogging for 30 minutes on day 1, go swimming for 40 minutes on day 2, and so forth) the end user may need to execute in order to achieve the weight loss. Similarly, if the template is designed to facilitate an end user to achieve a high score for the SAT, the template may be a schedule of when and what activities (e.g., read a particular book on day 1, work on math problems from a particular math book on day 2, and so forth) the end user may need to execute in order to achieve the high test score for the SAT. Note that in some cases a template may include one or more emulatable intermediate outcomes that are associated with the target outcome or outcomes associated with the template. For example, in the above weight loss example, the template may indicate the amount of weight loss an end user should have achieved (e.g., in order to achieve the target outcome) after emulating, for example, one week, two weeks, or a month of emulatable aspects indicated by the template.

In other cases, a template may merely be a collection of one or more emulatable aspects that does not define any relationships between the emulatable aspects. For example, a template designed to facilitate an end user to achieve relaxed state of mind may indicate two unlinked emulatable aspects, "get 8 hours of sleep each night," and "don't drink caffeine beverages." Such a template would not necessarily have any indication of relationship between the two emulatable aspects indicated by the template.

In order to facilitate understanding of the various concepts to be described herein, an introduction to the meaning of certain words and phrases to be used in the following discussion will now be provided. In brief, and as will be further described herein, an "aspect" may be any occurrence of any behavior, act, belief, characteristic, state, or any other facet associated with a source user or a group of source users. A "source user" may be any person, such as a microblogger, who may be the basis for one or more reported aspects. Note that a source user may not necessarily have to be the source for the one or more reported aspects that are related to the source user since reported aspects that are associated with a particular source user may be provided by other source users or by sensors.

A "reported aspect" may be any aspect associated with a source user that has been reported by, for example, one or more sensors or by one or more source users. In some instances, such a reported aspect may be reported in the form of a log entry such as a microblog entry or a status report. A "relevant reported aspect," in contrast, may be a reported aspect that is at least associated with one or more source users who have achieved one or more target outcomes (e.g., sought-after goals or desired outcomes). Alternatively, a "relevant reported aspect" may be a reported aspect that is relevant to achieving the one or more target outcomes. The relevancy of a reported aspect with respect to achieving the one or more target outcomes in some instances may be based on one or more relevancy factors as will be further described herein. Note that references in the following to "reported aspects" and "relevant reported aspects" will actually be in reference to data that indicate such information (e.g., data that indicate reported aspects and data that indicate relevant reported aspects) unless indicated otherwise.

A "target outcome" may be any type of desirable goal or result that may be sought by, for example, an end user. Examples of target outcomes include, for example, health-related outcomes such as weight loss or improved cardiovascular conditioning, athletic outcomes such as developing a particular athletic skill including being able to pitch a curve ball or achieving a particular golf handicap, physiological outcomes such as reduced blood pressure or blood glucose levels, social outcomes such as obtaining membership into an elite social club or attaining a particular social status, mental state outcomes such as achieving certain level of calmness or happiness, interpersonal or relational outcomes such as having lots of friends or developing skill to make friends, employment outcomes such as being promoted or developing certain work skills, academic or intellectual outcomes, and so forth.

An "end user" may be any person who is a direct or indirect beneficiary of one or more templates that may be developed based at least in part on one or more reported aspects that may be provided by, for example, one or more sensors. As briefly described above, a "source user" may be any person who may be the basis for one or more reported aspects. Note that although in most cases, a source user will be an actual (real) person who may be the basis for one or more reported aspects, in other cases, however, a source user may be a fictional person such as a composite of multiple "actual" source users. For example, reported aspects indicating actual aspects of a plurality of actual source users may be compiled and processed (e.g., normalized or averaged out) in order to create a fictional source user.

Figure 1B:
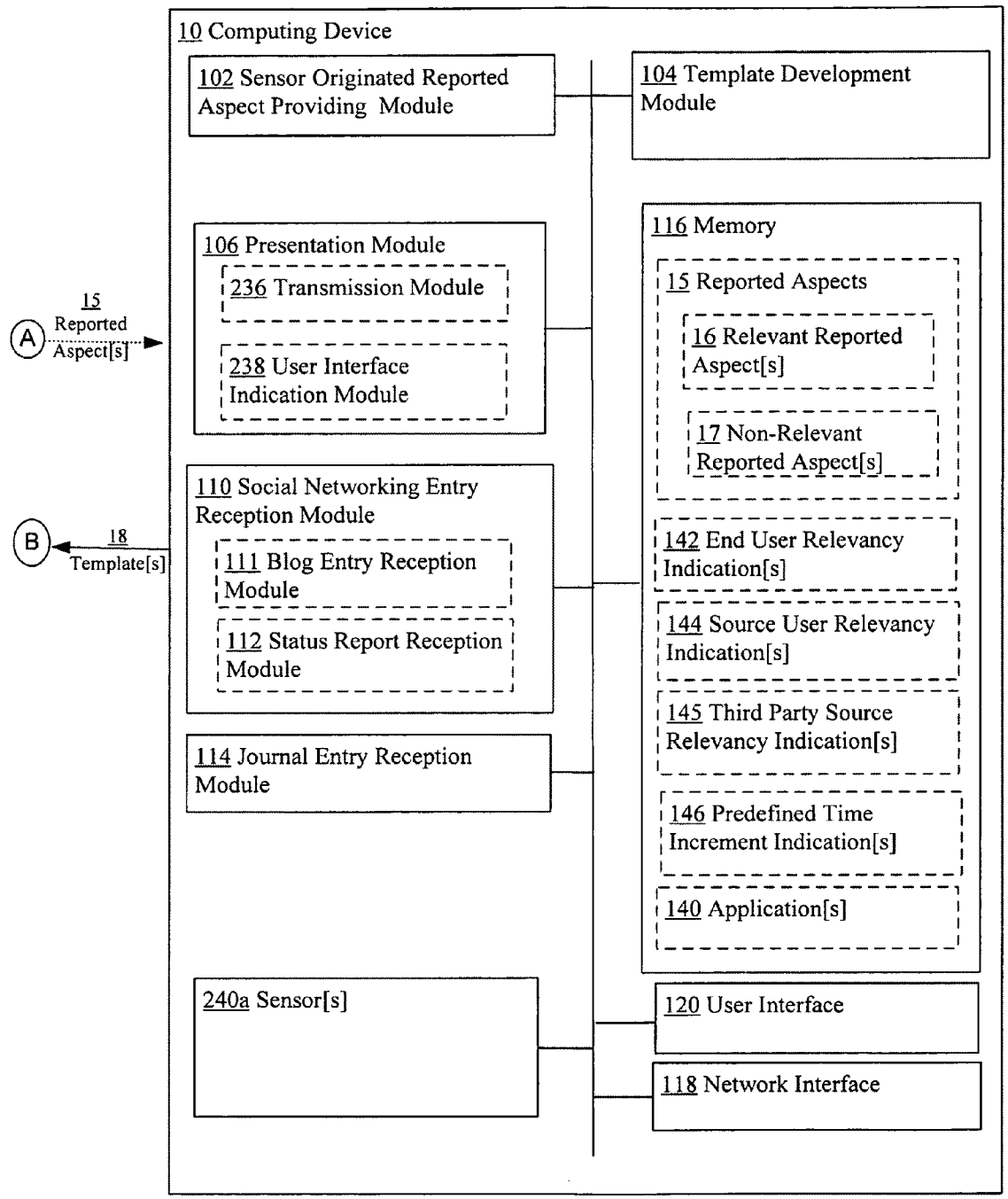

Turning now to FIGS. 1a, and 1b illustrating an example environment in which the methods, systems, circuitry, and computer program products in accordance with various embodiments may be implemented by a computing device 10. In particular, the methods, systems, circuitry, and computer program products may be implemented at any network device including at a peer-to-peer network component device. In various embodiments, the computing device 10 may be a server such as one of the one or more network servers 60 illustrated in FIG. 1a. Alternatively, the computing device 10 may be a source user device such as one of the local source user devices 20* illustrated in FIG. 1a. In still other embodiments, the computing device 10 may be an end user device such as one of the local end user device 30* illustrated in FIG. 1a. Note that in the following, "*" represents a wildcard. Thus, references in the following description to, for example, "a source user 2*" may be in reference to a source user 2a, a source user 2b, and so forth.

Note that for ease of understanding and explanation, the computing device 10 of the exemplary environment 100 of FIGS. 1a and 1b will be generally described in the following discussion operating as a server (e.g., server embodiment) rather than as an end user device or as a source user device. Further, although the following discussion related to the exemplary environment 100 of FIG. 1a and 1b assumes that the computing device 10 is a server, the following discussion will, for the most part, be applicable even if the computing device 10 was operating as an end user device (e.g., local end user device 30*) or as a source user device (e.g., local source user device 20*) with certain obvious exceptions (e.g., if the computing device 10 is an end user device or a source user device rather than a server, the computing device 10 may communicate with an end user 4* or a source user 2* directly through a user interface 120 rather than indirectly through a wireless network and/or wired network 50 as may be the case when the computing device 10 is a server). In some embodiments, the computing device 10 may operate via a web 1.0 or web 2.0 construct.

Referring back to FIGS. 1a and 1b, and as previously indicated, the computing device 10 may be a network device such as a server (e.g., a network server 60) that is designed to communicate with other network devices. For example, the computing device 10 may communicate with one or more source users 2* (e.g., source user 2a, source user 2b, and so forth) through one or more local source user devices 20* (e.g., local source user device 20a, local source user device 20b, and so forth), with one or more end users 4* (e.g., end user 4a, end user 4b, and so forth) through one or more local end user devices 30* (e.g., local end user device 30a, local end user device 30b, and so forth), with one or more sensor integrated devices 40 (e.g., a transportation vehicle such as a car, an exercise machine, or any other type of device that may have an integrated sensor designed to sense, for example, usage), with one or more network servers 60, and/or with one or more third parties 6 (e.g., one or more content providers, one or more network service providers, and/or one or more other parties) via a wireless network and/or wired network 50. In various implementations, the wireless and/or wired network 50 may include at least one of a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wireless and/or wired networks 50.

In various embodiments, the computing device 10 may be designed to, among other things, provide (e.g., obtain, retrieve, receive, solicit, and so forth) one or more reported aspects 15 associated with one or more source users 2* that were originally reported by one or more sensors 240*. Based at least on a portion of the one or more reported aspects 15 that are provided, the computing device 10 may develop one or more templates 18, the one or more templates 18 to be developed being designed to facilitate one or more end users 4* to achieve one or more target outcomes when one or more emulatable aspects indicated by the one or more templates 18 are emulated.

In various embodiments, the computing device 10 may randomly, semi-continuously, or continuously acquire (e.g., receive, retrieve, or solicit) reported aspects 15 associated one or more source user 2* that were at least originally reported by one or more sensors 240*. Such reported aspects 15 may indicate a variety of aspects (e.g., behavior aspects such as user activities, user states, environmental conditions, and so forth) associated with the one or more source users 2*. The reported aspects 15 to be acquired may, in some cases, include both reported aspects 15 that are relevant to achieving one or more target outcomes and reported aspects 15 that may not be relevant for achieving the one or more target outcomes.

The reported aspects 15 may be acquired from a variety of sources. For example, in some embodiments, the reported aspects 15 that may be acquired by the computing device 10 may be acquired from one or more network servers 60, from one or more local source user devices 20*, from one or more sensor integrated devices 40 (e.g., exercise machine or an automobile with integrated sensors), from one or more third parties 6 (e.g., content providers, network service providers, and so forth), and/or from a memory 116. In embodiments where the reported aspects 15 are acquired through a wireless network and/or a wired network 50, the acquisition of the reported aspects 15 may be as a result of transmitting one or more solicitations for such data.

Upon providing (e.g., acquiring) one or more reported aspects 15 that are associated with the one or more source users 2* and that were at least originally reported by one or more sensors 240*, the computing device 10 may develop one or more templates 18 that are designed to facilitate one or more end users 4* to achieve one or more target outcomes, the development of one or more templates 18 based on at least a portion of the one or more reported aspects that are provided.

In particular, in order to develop the one or more templates 18, the computer device 10 may be designed to identify from the one or more reported aspects 15 that have been provided, one or more relevant reported aspects 16 that are determined to be relevant for achieving the one or more target outcomes. In some cases, this may mean at least identifying those reported aspects 15 that are associated with source users 2* who have been identified as achieving the one or more target outcomes. Alternatively or additionally, a reported aspect 15 may be deemed relevant for achieving the one or more target outcomes when the reported aspect 15 is determined to be relevant with respect to certain relevancy factors as will be further described herein.

In any event, upon identifying the one or more relevant reported aspects 16 that are relevant for achieving the one or more target outcomes, one or more templates 18 may be developed by including into each of the one or more templates 18, one or more emulatable aspects that corresponds to the one or more relevant reported aspects 16. In cases where multiple emulatable aspects are included into a template 18, one or more relationships (e.g., temporal, specific time, or spatial relationship) between the multiple emulatable aspects may be defined in the template 18.

In some alternative embodiments, the computing device 10 may be configured to selectively provide (e.g., acquire) reported aspects 15 that are relevant for achieving one or more target outcomes. In other words, selectively acquiring relevant reported aspects 16 rather than acquiring reported aspects 15 that are associated with the one or more source users 2* and that were originally reported by one or more sensors 240* and that include both relevant reported aspects 16 and non-relevant reported aspects 17. For example, acquiring only reported aspects 15 that are associated with source users 2* who have achieved the one or more target outcomes and/or that are relevant with respect to certain relevancy factors. For these embodiments, there may not be any need for an operation to identify relevant reported aspects 16 from the acquired reported aspects 15 since all of the acquired reported aspects 15 may be relevant for achieving the one or more target outcomes. Further, for these embodiments, one or more templates 18 may be developed by the computing device 10 based directly on the provided reported aspects 15 (e.g., developing the one or more templates 18 by including into each of the one or more templates 18 one or more emulatable aspects that corresponds to one or more provided reported aspects 15) rather than having to filter through the reported aspects 15 in order to identify the relevant reported aspects 16.

After developing the one or more templates 18, the computing device 10 may be designed to present the one or more templates 18. The one or more templates 18 may be presented by transmitting via the wireless network and/or wired network 50 the one or more templates 18 to one or more network servers 60, to one or more source users 2* (e.g., one or more local source user devices 20*), to one or more end users 4* (e.g., one or more local end user devices 30*), and/or to one or more third parties 6. In embodiments where the computing device 10 is a source user device or an end user device, the computing device 10 may indicate (e.g., visually display or audioally indicate) the one or more templates 18 via a user interface 120.

In some embodiments, the development of the one or more templates 18 may include developing the one or more templates 18 based on one or more reported aspects 15 that are associated with one or more source users 2* and that were originally reported by the one or more sensors 240* and one or more reported aspects 15 that are associated with the one or more source users 2* and that were originally reported by the source users 2*. In other words, for these embodiments, the one or more templates 18 may be developed based on data reported by one or more sensors 240* and by one or more source users 2*. In some cases, the one or more reported aspects 15 that are provided by the one or more source users 2* may have been provided through social networking entries such as blog or microblog entries, status reports, and so forth.

As will be further described, the one or more sensors 240* may include almost any type of sensors 240* including, for example, sensors 240* that can sense various physical characteristics of a source user 2* (e.g., heart rate sensor or blood pressure sensor), sensors 240* that can sense activities of a source user 2* (e.g., a pedometer), sensors 240* that can sense environment conditions (e.g., air quality sensors), sensors 240* that can sense the location of a source user 2* (e.g., global positioning system or GPS), sensors 240* that can provide physiological data that may be processed in order to determine inferred mental states of users, and so forth.

In some embodiments, the computing device 10, as previously indicated, may be a server (e.g., one of the one or more network servers 60) that may be located at a single network site, located across multiple network sites, or may be a conglomeration of servers located at multiple network sites. In embodiments in which the computing device 10 is a source user device (e.g., local source user device 20*) or an end user device (e.g., local end user device 30*) rather than a network server 60, the computing device 10 may be any one of a wide range of mobile or stationary computing/communication devices including, for example, a laptop, a desktop, a workstation, a cellular telephone, a personal digital assistant (PDA), a Smartphone, a web tablet such as a Netbook, and so forth.

With respect to the one or more sensor integrated devices 40 of the exemplary environment 100 of FIGS. 1a and 1b, the one or more sensor integrated devices 40 may directly communicate with the wireless network and/or the wired network 50 in some embodiments. Alternatively, the one or more sensor integrated devices 40 may indirectly communicate with the wireless network and/or the wired network 50 via the one or more local source user devices 20* (e.g., via, for example, personal area network or PAN). In various embodiments, a sensor integrated device 40 may be a variety of devices that may comprise of one or more sensors 240c and that may be operated or used by a source user 2*. Examples of such devices include, for example, a transportation vehicle (e.g., automobile, a motorcycle, a boat, a plane, and so forth), an exercise machine (e.g., a treadmill), a household appliance (e.g., television set), and so forth.

Figure 2A:
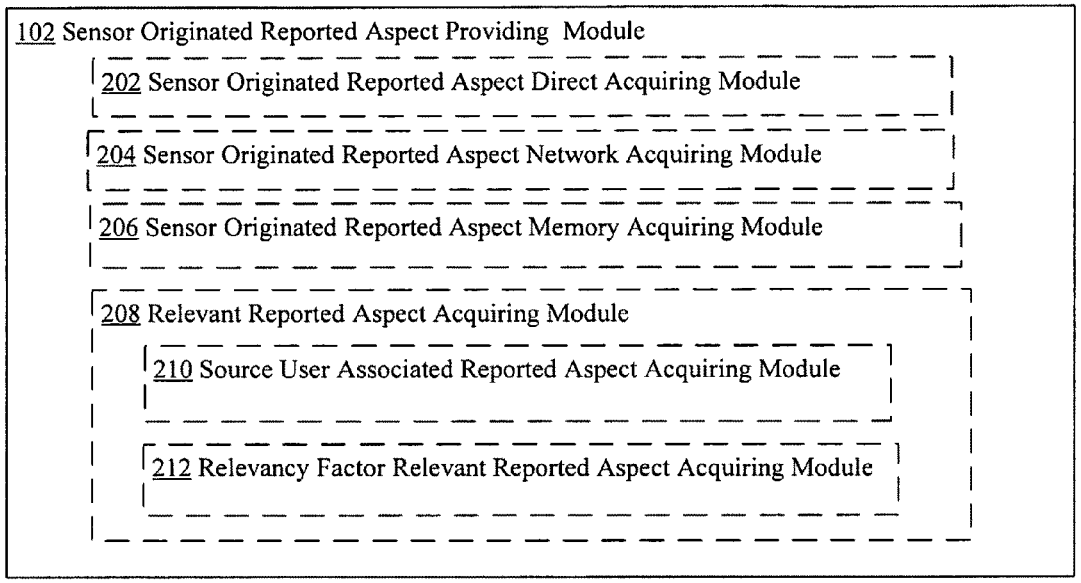
FIG. 2a shows another perspective of the Sensor Originated Reported Aspect Providing Module 102 of the Computing Device 10 of FIG. 1b.
Figure 2C:
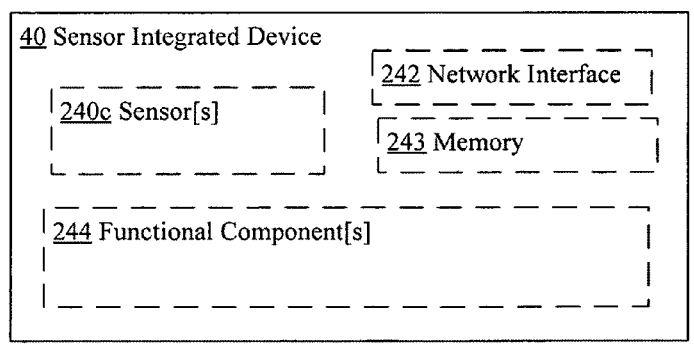
FIG. 2c shows one perspective of one of the Sensor Integrated Devices 40 of the exemplary environment 100 of FIGS. 1a and 1b.

As will be further described herein with respect to FIG. 2c, each of the one or more sensor integrated devices 40 (see FIG. 2c) may include one or more sensors 240c, a network interface 242, a memory 243, and/or one or more functional components 244. The one or more sensors 240c may be designed to detect or sense one or more aspects associated with one or more source users 2* such as usage of the sensor integrated device 40 by, for example a source user 2*. In some cases, the one or more sensors 240c may be designed to sense or monitor certain physical characteristics of a source user 2* when the sensor integrated device 40 is being used for its functional purpose. For example, some exercise machines such as treadmills have sensors 240* that can monitor the heart rate of, for example, a source user 2* when the source user 2* is using the treadmill.

Figure 2B:
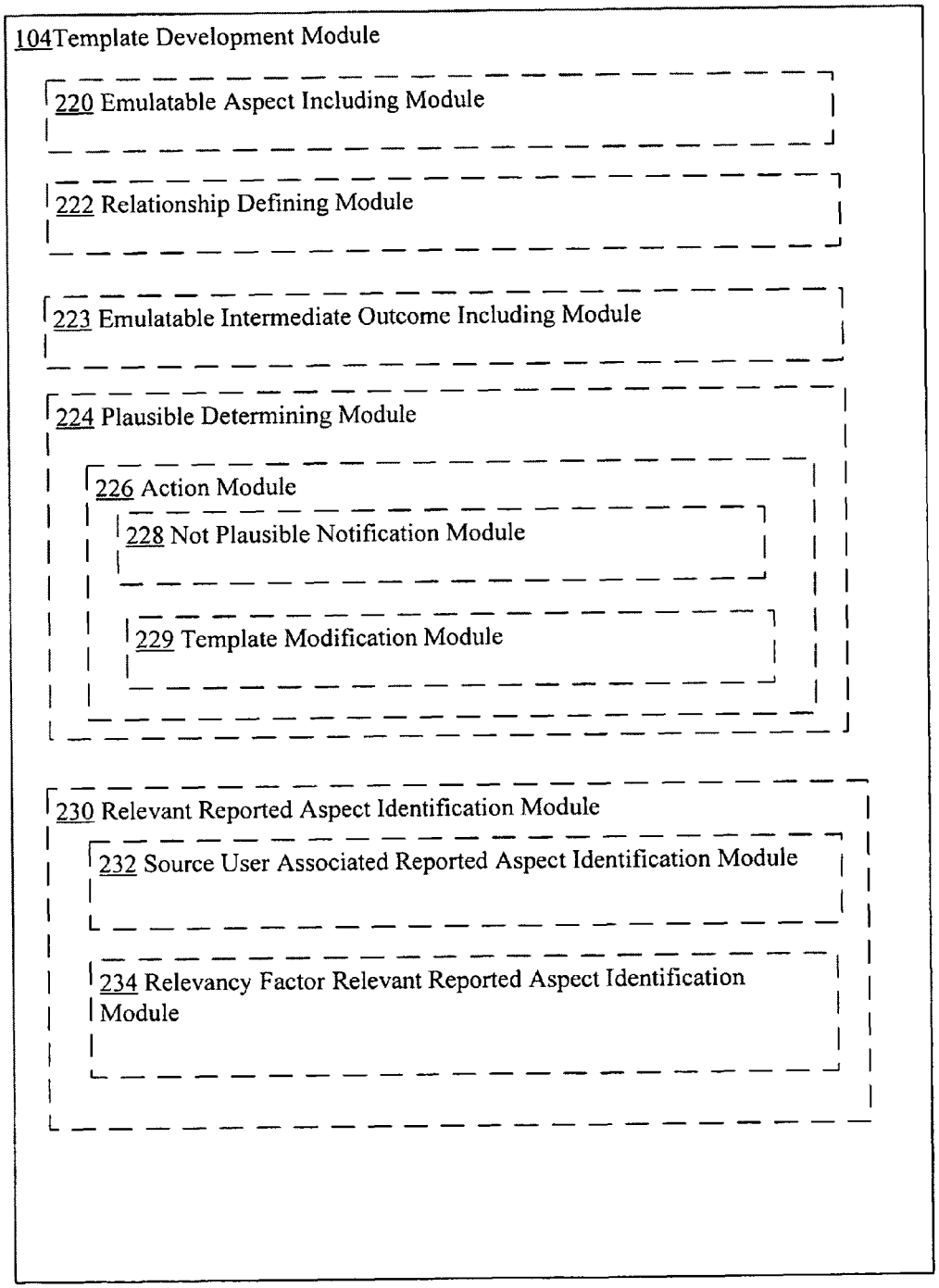
FIG. 2b shows another perspective of the Template Development Module 104 of the Computing Device 10 of FIG. 1b.
Figure 2D:
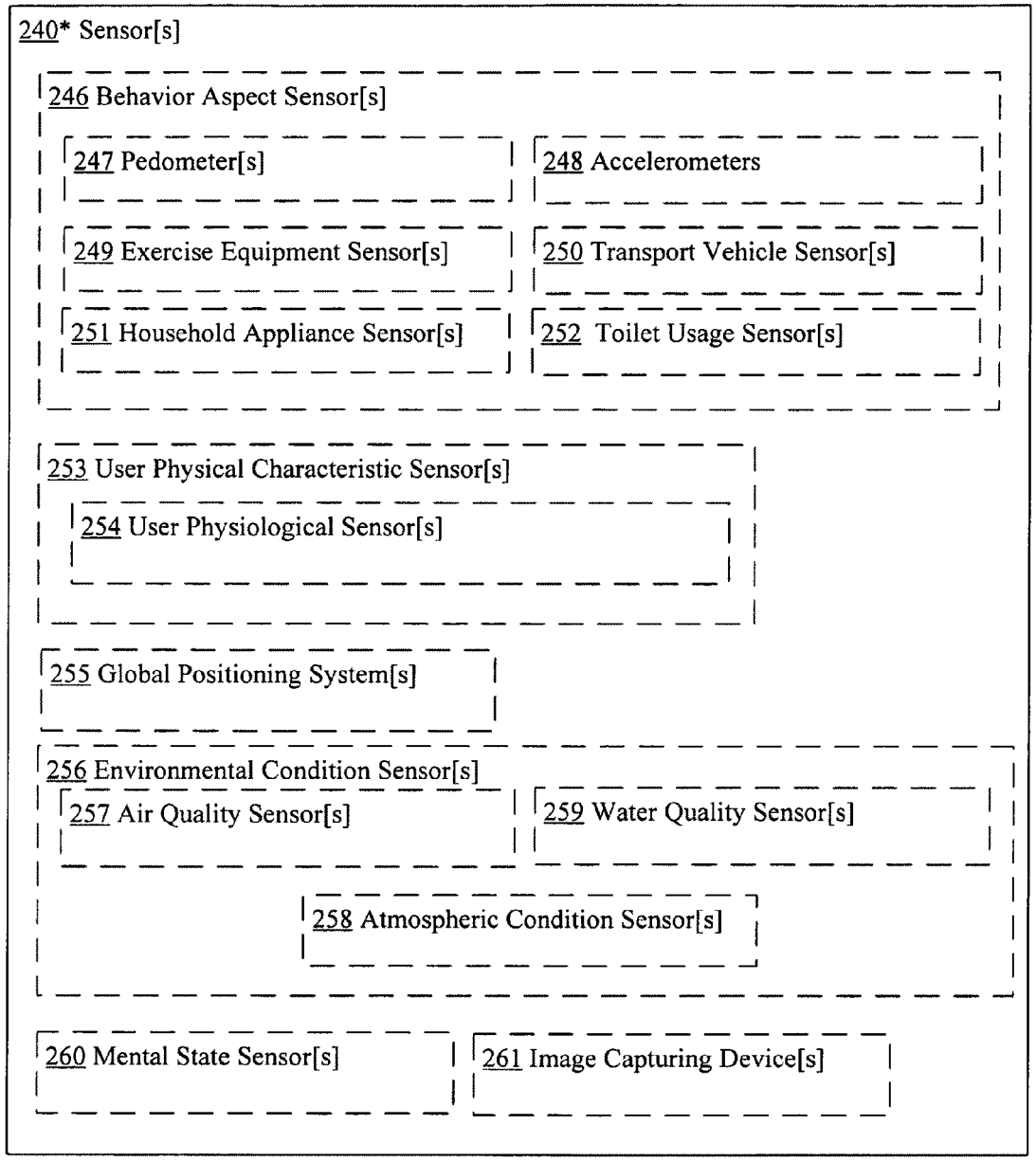
FIG. 2d shows one perspective of the one or more sensors 240* (e.g., one or more sensors 240a, one or more sensors 240b, or one or more sensors 240c) of the exemplary environment 100 of FIGS. 1a and 1b.

As illustrated in FIGS. 1a and 1b, the computing device 10, the one or more local source user devices 20*, and the one or more sensor integrated devices 40 may include one or more sensors 240* (e.g., one or more sensors 240a for the computing device 10, one or more sensors 240b for the one or more local source user devices 20*, and one or more sensors 240c for the one or more sensor integrated devices 40) that are designed to detect or monitor various aspects of one or more source users 2*. FIG. 2d illustrates the types of devices that may be included in the one or more sensors 240* of the computing device 10, the one or more local source user devices 20*, and the one or more sensor integrated devices 40.

As illustrated in FIG. 2d, in some embodiments, the one or more sensors 240* that may be included with the computing device 10, the one or more local source user devices 20*, and/or the one or more sensor integrated devices 40 may include one or more behavior aspect sensors 246 that are designed to sense one or more behavior aspects of one or more source users 2*. Examples of sensing devices that may be considered behavior aspect sensors 246 include, for example, pedometers 247, accelerometers 248, exercise equipment sensors 249, transport vehicle sensors 250, household appliance sensors 251, and toilet usage sensors 252. Note that although some of these sensing devices (e.g., pedometers 247 and accelerometers 248 may directly detect activities of users (e.g., source users 2*), other sensing devices such as exercise equipment sensors 249 and transport vehicle sensors 250 may only sense usage of the underlying devices (e.g., exercise equipment and transport vehicle). Further, some sensors 240* such as exercise equipment sensors 249 may include sensing devices for detecting physiological characteristics (e.g., heart rate) of users.

In some embodiments, the one or more sensors 240* that may be included with the computing device 10, the one or more local source user devices 20*, and/or the one or more sensor integrated devices 40 may include one or more user physical characteristic sensors 253 that are designed to sense one or more physical characteristics of one or more source users 2*. Examples of sensing devices that may be considered physical characteristic sensors 253 include, for example, image capturing devices 261 such as digital cameras or portable ultrasound devices (e.g., to capture internal or external images of source users 2*), audio capturing devices (e.g., to capture voice or internal sound such as heart rate), and/or user physiological sensors 254. Examples of physiological sensors 254 include, for example, fNIR devices, fMRI devices, heart rate monitors, blood pressure devices, blood glucose meters, and so forth. Note that some physiological sensors 254 may be used in order to obtain physiological data that may be processed using appropriate software in order to determine at last inferred mental states of users.

In some embodiments, the one or more sensors 240* that may be included with the computing device 10, the one or more local source user devices 20*, and/or the one or more sensor integrated devices 40 may include one or more global position system (GPS) devices 255 that are designed to find the geographical locations of one or more source users 2*. As indicated earlier, GPS devices 255 are now commonly integrated into many mobile communication devices such as cellular telephones and Smartphones.

In some embodiments, the one or more sensors 240* that may be included with the computing device 10, the one or more local source user devices 20*, and/or the one or more sensor integrated devices 40 may include one or more user environmental condition sensors 256 that are designed to sense one or more environmental conditions associated with one or more source users 2*. Examples of sensing devices that may be considered environmental condition sensors 256 include, for example, air quality sensors 257 designed to sense quality of air (e.g., pollutant amount, pollen count, gas level, and so forth) that one or more source users 2* breathes, water quality sensors 259 designed to sense quality of water being drunk by one or more source users 2*, and/or atmospheric condition sensors 258 that are designed to measure certain atmospheric conditions such as temperature, humidity, pressure, wind speed, and so forth.

In some embodiments, the one or more sensors 240* that may be included with the computing device 10, the one or more local source user devices 20*, and/or the one or more sensor integrated devices 40 may include one or more mental state sensors 260 that are designed to sense one or more physical or physiological characteristics of one or more source users 2* that may be processed, using the appropriate software, in order to determine mental states of the one or more source users 2*. Examples of such mental state sensors 260 include, for example, fNIR devices, fMRI devices, EEG devices, MEG devices, galvanic skin sensor devices, and so forth.

As earlier indicated, in some embodiments, the one or more sensors 240* that may be included with the computing device 10, the one or more local source user devices 20*, and/or the one or more sensor integrated devices 40 may include one or more image capturing devices 261 (e.g., digital camera, camcorder, ultrasound devices, and so forth) that may be employed in order to capture, for example, physical characteristics of one or more source users 2*. Such devices may also be used in order to sense other types of aspects associated with one or more source users 2*. For example, in some cases, image capturing devices 261 may be employed in order to detect or capture activities being executed by one or more source users 2*. By using the appropriate software, images captured through such devices may be properly interpreted.

Referring back to the exemplary environment 100 of FIGS. 1a and 1b, each of the one or more local source user devices 20* and each of the one or more local end user devices 30* (as well as the computing device 10 in embodiments in which the computing device 10 is an end user device or a source user device) may be any one of a variety of computing/communication devices including, for example, a cellular phone, a personal digital assistant (PDA), a laptop, a desktop, or other types of computing/communication devices. In some embodiments, the one or more local source user devices 20* and/or the one or more local end user devices 30* (as well as the computing device 10 in some embodiments) may be a handheld device such as a cellular telephone, a Smartphone, a Mobile Internet Device (MID), an Ultra Mobile Personal Computer (UMPC), a convergent device such as a personal digital assistant (PDA), and so forth. Alternatively, such local client devices (e.g., local source user device 20* and/or local end user device 30*) may be a laptop, a desktop, a workstation, a web tablet such as a Netbook, or other types of devices that may not be a handheld device in various alternative implementations.

The computing device 10 as illustrated in FIG. 1b may include one or more modules, sub-modules, and various other components. As shown, the computing device 10 may include at least a sensor originated reported aspect providing module 102 (which may further include one or more sub-modules as illustrated in FIG. 2a) and a template development module 104 (which may also include one or more sub-modules as illustrated in FIG. 2b). In various embodiments, the computing device 10 may further include a presentation module 106 (which may further include a transmission module 236 and/or a user interface indication module 238) and a memory 116 (which may store a plurality of reported aspects 15 that may further include one or more relevant reported aspects 16 and/ or one or more non-relevant reported aspects 17, one or more end user relevancy indications 142, one or more source user relevancy indications 144, one or more third party source relevancy indications 145, one or more predefined time increment indications 146, and/or one or more applications 140).

The computing device 10 may also include, in various embodiments, a network interface 118 (e.g., a network interface card or NIC), a user interface 120, a social networking entry reception module 110 (which may further include a blog entry reception module 111 and/or a status report reception module 112), a journal entry reception module 114, and/or one or more sensors 240a. In some cases, the presence or absence of some of these modules and sub-modules may depend on, for example, whether the computing device 10 is a server, an end user device, or a source user device. For example, if the computing device 10 is a server, then the computing device 10 may not include a user interface 120.

Referring now to the sensor originated reported aspect providing module 102, the sensor originated reported aspect providing module 102 may be configured to, among other things, provide (e.g., acquire from a memory 116 and/or from a wireless network and/or a wired network 50) one or more reported aspects 15 associated with one or more source users 2* that were originally reported by one or more sensors 240*. In contrast, the template development module 104 may be configured to, among other things, develop one or more templates 18 designed to facilitate one or more end users 4* to achieve one or more target outcomes when one or more emulatable aspects indicated by the one or more templates 18 are emulated, the development of the one or more templates 18 being based at least on a portion of the one or more reported aspects 15.

The memory 116 may be designed to store various data including a plurality of reported aspects 15 associated with one or more source user 2*. The plurality of reported aspects 15 stored in the memory 116 may include one or more reported aspects 15 that were originally reported by one or more sensors 240* and in some cases, another one or more reported aspects 15 that were originally reported by the one or more source users 2*. The plurality of reported aspects 15 stored in memory 116 may include, in various implementations, one or more relevant reported aspects 16 that are relevant to achieving one or more target outcomes and/or one or more non-relevant reported aspects 17 that may not be relevant for achieving the one or more target outcomes.

Other types of data may be stored in the memory 116 in various implementations including, for example, one or more end user relevancy indications 142 (e.g., one or more indications that indicate the types of reported aspects 15 that an end user 4 has an interest in or believes is relevant to achieving one or more target outcomes) and/or one or more source user relevancy indications 144 (e.g., one or more indications provided by a source user 2* that indicate at least which types of reported aspects 15 are relevant to achieving one or more target outcomes).

In some cases, the memory 116 may also include, for example, one or more third party source relevancy indications 145 (e.g., one or more indications provided by one or more third party sources such as one or more third parties 6 that indicate at least which types of reported aspects 15 are relevant to achieving one or more target outcomes), one or more predefined time increment indications 146 (e.g., one or more indications that indicate at least one time increment, such as a time interval or window, that may be considered in order to determine whether, for example, a reported aspect 15 is relevant for achieving a target outcome if the reported aspect 15 indicates an aspect that occurred within the time increment from an occurrence of the target outcome as successfully achieved by, for example, a source user 2*), and/or one or more applications 140 (e.g., a text messaging application, an instant messaging application, an email application, a social networking application, a voice recognition system, a Web 1.0 application, and/or Web 2.0 application to facilitate in communicating via, for example, the World Wide Web). In various implementations, the memory 116 may comprise of one or more of a mass storage device, a read-only memory (ROM), a programmable read-only memory (PROM), an erasable programmable read-only memory (EPROM), a cache memory such as random access memory (RAM), a flash memory, a synchronous random access memory (SRAM), a dynamic random access memory (DRAM), and/or other types of memory devices.

The social networking entry reception module 110 may be configured to receive social networking entries from one or more sources including, for example, from one or more source users 2*, from one or more end users 4*, from one or more third parties 6, from one or more sensor integrated devices 40, and/or from one or more network servers 60. The social networking entry reception module 110 may further include a blog entry reception module 111 for receiving blog entries (e.g. microblog entries) and/or a status report reception module 112 for receiving social networking status reports. The journal entry reception module 114 may be configured to receive journal entries from, for example, one or more source users 2*, one or more end users 4*, and/or one or more third parties 6 (e.g., a non-user). The user interface 120 may include one or more of, for example, a display monitor, a touchscreen, a keyboard, a keypad, a mouse, an audio system including one or more speakers, a microphone, an image capturing device such as a digital camera, and so forth.

FIG. 2a illustrates particular implementations of the sensor originated reported aspect providing module 102 of the computing device 10 of FIG. 1b. As illustrated, the sensor originated reported aspect providing module 102 may include, in various implementations, one or more sub-modules. For example, in some implementations, the sensor originated reported aspect providing module 102 may include a sensor originated reported aspect direct acquiring module 202, a sensor originated reported aspect network acquiring module 204, a sensor originated reported aspect memory acquiring module 206, and/or a relevant reported aspect acquiring module 208 (which may further include a source user associated reported aspect acquiring module 210 and/or a relevancy factor relevant reported aspect acquiring module 212).

The sensor originated reported aspect direct acquiring module 202 may be configured to acquire one or more reported aspects 15 directly from one or more sensors 240a (e.g., as may be the case when the computing device 10 is a source user device). The sensor originated reported aspect network acquiring module 204 may be configured to acquire one or more reported aspects 15 via at least one of a wireless network and a wired network 50. The sensor originated reported aspect memory acquiring module 206 may be configured to acquire one or more reported aspects 15 from the memory 116.

In various implementations, the relevant reported aspect acquiring module 208 may be configured to, among other things, selectively acquire one or more relevant reported aspects 16 that were originally reported by the one or more sensors 240* and that are relevant with respect to achieving the one or more target outcomes. In order to facilitate the acquisition of the one or more relevant reported aspects 16, the relevant reported aspect acquiring module 208, in some implementations, may further include the source user associated reported aspect acquiring module 210 that is configured to selectively acquire one or more reported aspects 15 that were originally reported by one or more sensors 240* and that are associated with one or more source users 2* who have achieved the one or more target outcomes. In the same or different implementations, the relevant reported aspect acquiring module 208 may include the relevancy factor relevant reported aspect acquiring module 212 that may be configured to, among other things, selectively acquire one or more reported aspects 15 that were originally reported by the one or more sensors 240* and that are relevant with respect to one or more relevancy factors (e.g., indications provided by an end user 4* that indicates that only particular types of user behaviors such as dietary behaviors are relevant).

FIG. 2b illustrates particular implementations of the template development module 104 of FIG. 1b. The template development module 104, as illustrated, may include one or more sub-modules. For example, in various implementations, the template development module 104 may include an emulatable aspect including module 220, a relationship defining module 222, an emulatable intermediate outcome including module 223, a plausible determining module 224 (which may further include an action module 226 that may further include a not plausible notification module 228 and/or a template modification module 229), and/or a relevant reported aspect identification module 230 (which may further include a source user associated reported aspect identification module 232 and/or a relevancy factor relevant reported aspect identification module 234).

In brief, the emulatable aspect including module 220 may be configured to include into each of one or more templates 18 to be developed one or more emulatable aspects that correspond to at least a portion of one or more reported aspects 15 that may be provided by the sensor originated reported aspect providing module 102. The relationship defining module 222, in contrast, may be configured to define in each of the one or more templates 18 to be developed at least one temporal, specific time, or spatial relationship between at least two of the plurality of emulatable aspects that may be included in each of the one or more templates 18. The emulatable intermediate outcome including module 223 may be configured to include into the one or more templates 18 to be developed one or more emulatable intermediate outcomes that are associated with the one or more target outcomes, for example, if one of the target outcomes is to lose 20 pounds of body weight, an emulatable intermediate outcome might be a weight loss of 10 pounds at the midway point of the template 18 to be developed.

The plausible determining module 224 may be configured to determine whether at least one of one or more emulatable aspects to be included in the one or more templates 18 to be developed is a plausible aspect that has been successfully emulated by one or more third parties 6, and if not plausible, prompting for example the action module 226 to execute one or more actions. The not plausible notification module 228 that may be included in the action module 226 may be configured to notify, in response to a determination that the at least one of the one or more emulatable aspects to be included in the one or more templates 18 is not a plausible aspect, at least one of an end user 4*, a source user 2*, and a third party 6 regarding the determination that at least one of the one or more emulatable aspects to be included in the one or more templates 18 is not a plausible aspect. In contrast, the template modification module 229 that may be included in the action module 226 may be configured to modify, in response to a determination that the at least one of the one or more emulatable aspects is not a plausible aspect, at least one of the one or more templates 18 by revising the at least one of the one or more emulatable aspects determined to be not a plausible aspect or by replacing the at least one of the one or more emulatable aspects determined to be not a plausible aspect with at least one replacement emulatable aspect that is a plausible aspect that has been successfully emulated by one or more third parties 6.

The relevant reported aspect identification module 230 that may be included in the template development module 104 may be configured to identify from the one or more reported aspects 15 that are provided by the sensor originated reported aspect providing module 102 one or more relevant reported aspects 16 that were originally reported by the one or more sensors 240* and that are relevant with respect to achieving the one or more target outcomes. To facilitate the relevant reported aspect identification module 230 in identifying the relevant reported aspects 16, the relevant reported aspect identification module 230 may include the source user associated reported aspect identification module 232 configured to identify one or more reported aspects 15 that were originally reported by the one or more sensors 240* and that are associated with one or more source users 2* who have been determined to have achieved the one or more target outcomes.

In some implementations, the relevant reported aspect identification module 230 may include a relevancy factor relevant reported aspect identification module 234 that is configured to identify one or more reported aspects 15 that were originally reported by the one or more sensors 240* and that are relevant with respect to one or more relevancy factors. The various relevancy factors that may be considered in determining relevancy of a reported aspect 15 with respect to achieving one or more target outcomes will be discussed in greater detail herein.

Referring now to FIG. 2c illustrating one of the sensor integrated devices 40 of FIGS. 1a and 1b. The sensor integrated device 40, in various implementations, may include at least one or more sensors 240c. The one or more sensors 240 that may be included in a sensor integrated device 40 (as well as the computing device 10 and/or one or more of the local source user devices 20*) may be designed to sense or detect one or more aspects associated with one or more source users 2*. For example, in various implementations, the one or more sensors 240 may include one or more devices that can monitor a user's physiological characteristics such as blood pressure sensors, heart rate monitors, glucometers (e.g., blood glucose meter), and so forth.

The sensor integrated device 40 may further include a network interface 242 (similar to the network interface 118 of the computing device 10), a memory 243 (similar to memory 116 of the computing device 10), and one or more functional components 244. With respect to the one or more functional components 244, and as an illustration, if the sensor integrated device 40 was an automobile, then the functional components 244 may include an engine, four tires, steering system, transmission system, and so forth.

Referring back to the computing device 10 of FIG. 1b, the various modules (e.g., the sensor originated reported aspect providing module 102, the template development module 104, and so forth) along with their sub-modules included in the computing device 10 may be implemented using hardware, software, firmware, or any combination thereof. For example, in some implementations, the sensor originated reported aspect providing module 102 and/or the template development module 104 may be implemented with a processor 802 (e.g., microprocessor, controller, and so forth) executing computer readable instructions 804 (e.g., computer program product) stored in a storage medium 806 (e.g., volatile or non-volatile memory) such as a signal-bearing medium as depicted in the computing device 10 of FIG. 8. Alternatively, hardware such as application specific integrated circuit (ASIC) may be employed in order to implement such modules in some alternative implementations.

Figure 3:
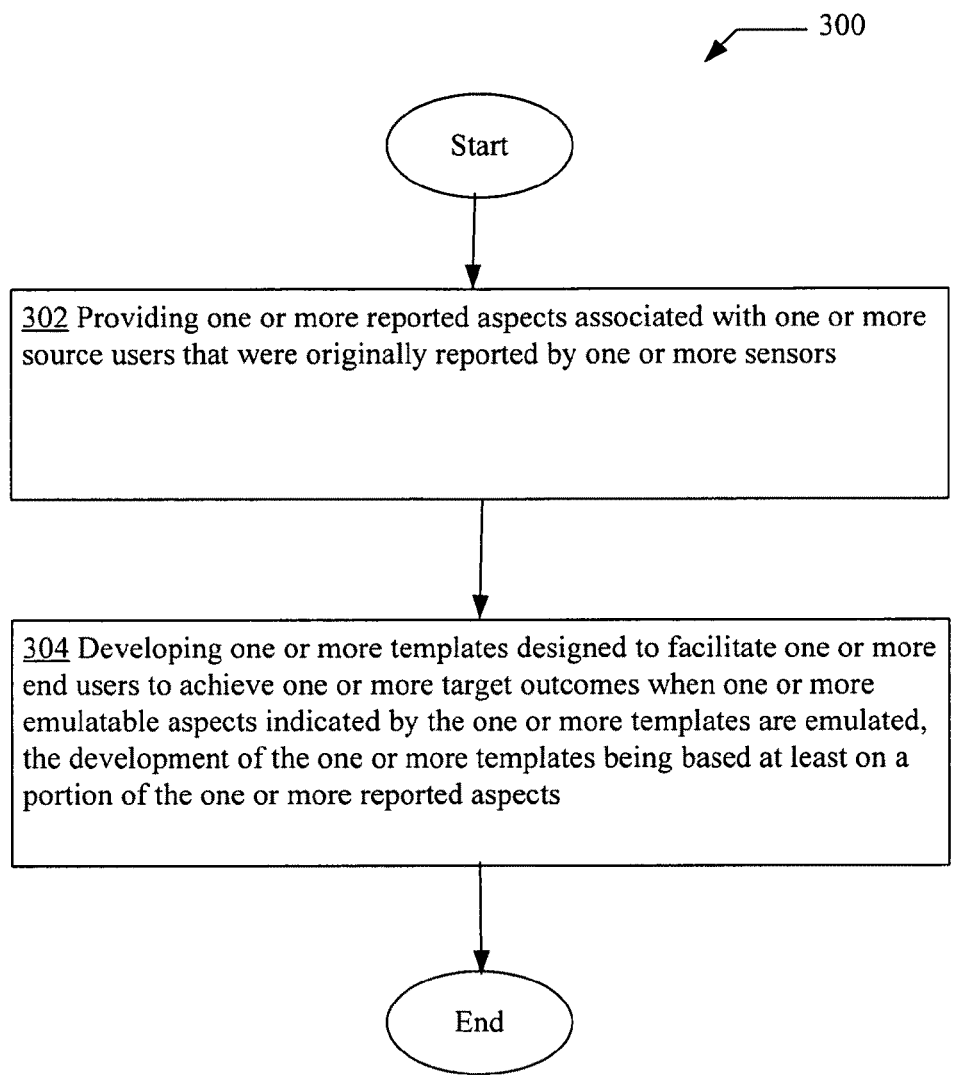
FIG. 3 is a high-level logic flowchart of a process.

A more detailed discussion relating to the functional aspects of the computing device 10 of FIG. 1b will now be provided with respect to the processes and operations to be described herein. FIG. 3 illustrates an operational flow 300 representing example operations directed to, among other things, development of one or more templates designed to facilitate one or more end users to achieve one or more target outcomes when one or more emulatable aspects indicated by the one or more templates are emulated, the development of the one or more templates being based, at least in part on at least a portion of one or more reported aspects associated with one or more source users that were originally reported by one or more sensors.

In FIG. 3 and in the following figures that include various examples of operational flows, discussions and explanations of the operational flows will be provided with respect to the exemplary environment 100 described above as illustrated in FIGS. 1a and 1b, and/or with respect to other examples (e.g., as provided in FIGS. 2a, 2b, 2c, and 2d) and contexts. However, it should be understood that the operational flows may be executed in a number of other environments and contexts, and/or in modified versions of FIGS. 1a, 1b, 2a, 2b, 2c, and 2d. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a sensor originated reported aspect providing operation 302 for providing one or more reported aspects associated with one or more source users that were originally reported by one or more sensors. For instance, and as an illustration, the sensor originated reported aspect providing module 102 of the computing device 10 of FIG. 1b providing (e.g., acquiring, retrieving, finding, locating, soliciting for, and so forth) one or more reported aspects 15 associated with one or more source users 2* that were originally reported (e.g., initially detected or sensed) by one or more sensors 240* (e.g., sensors 240* designed to sense one or more aspects associated with one or more source users 2* including, for example, behavior aspects associated with the one or more source users 2*).

In addition to the sensor originated reported aspect providing operation 302, operational flow 300 may also include a template developing operation 304 for developing one or more templates designed to facilitate one or more end users to achieve one or more target outcomes when one or more emulatable aspects indicated by the one or more templates are emulated, the development of the one or more templates being based at least on a portion of the one or more reported aspects. For instance, the template development module 104 of the computing device 10 developing one or more templates 18 designed to facilitate one or more end users 4* to achieve one or more target outcomes when one or more emulatable aspects indicated by the one or more templates 18 are emulated, the development of the one or more templates 18 being based at least on a portion of the one or more reported aspects 15. As will be further described herein, the sensor originated reported aspect providing operation 302 as well as the template developing operation 304 may be implemented in a number of different ways in various alternative implementations.

Figure 4A:
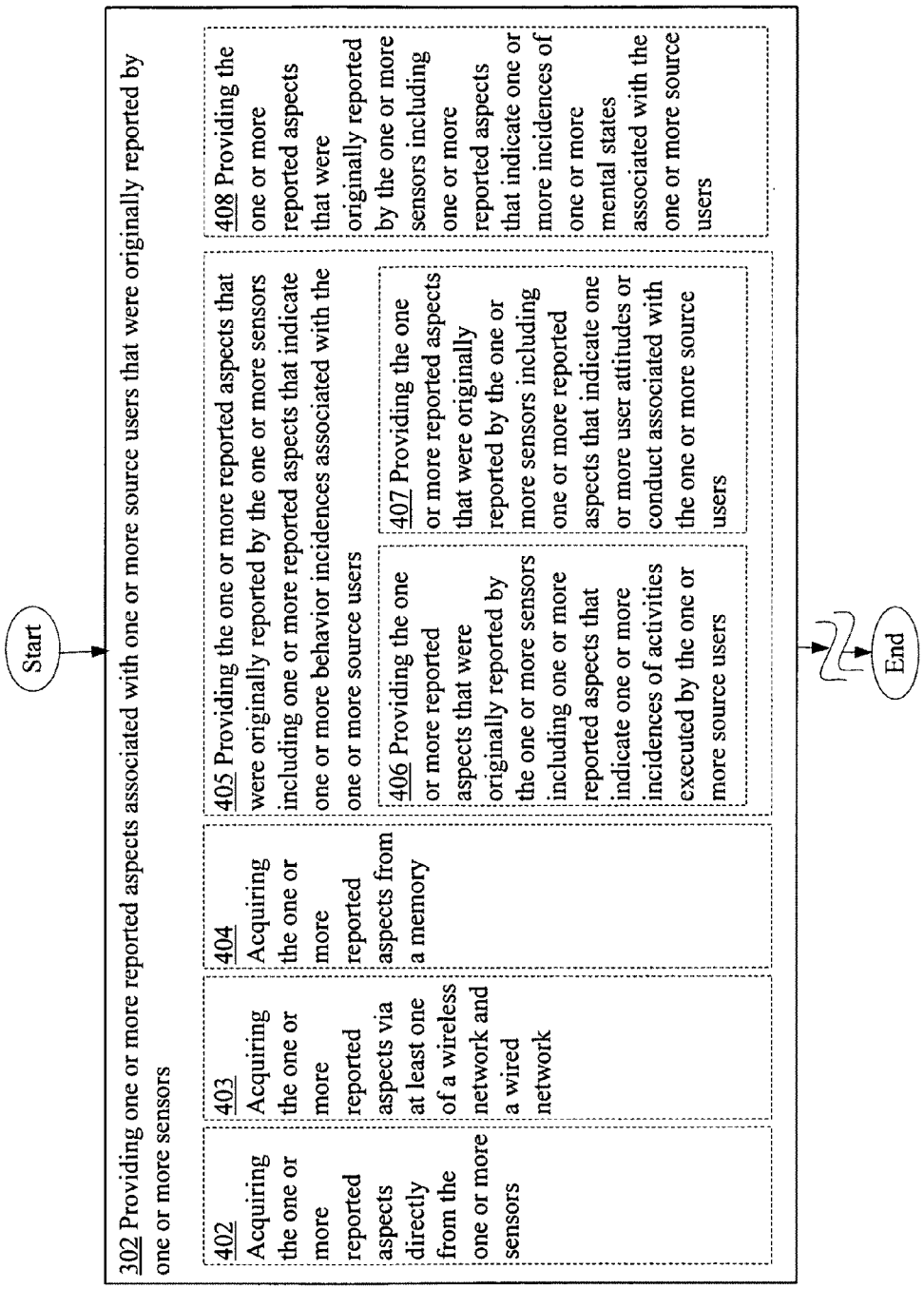
FIG. 4a is a high-level logic flowchart of a process depicting alternate implementations of the sensor originated reported aspect providing operation 302 of FIG. 3.

For example, FIGS. 4a, 4b, 4c, 4d, 4e, and 4f illustrate the various ways that the sensor originated reported aspect providing operation 302 of FIG. 3 may be executed in various alternative implementations. For instance, the one or more reported aspects to be provided by the sensor originated reported aspect providing operation 302 may be provided by acquiring the one or more reported aspects from a variety of sources. In some implementations, for example, the sensor originated reported aspect providing operation 302 of FIG. 3 may include an operation 402 for acquiring the one or more reported aspects directly from the one or more sensors as depicted in FIG. 4a. For instance, the sensor originated reported aspect direct acquiring module 202 (see FIG. 2a) of the computing device 10 of FIG. 1b acquiring (e.g., receiving, prompting for, collecting, and so forth) the one or more reported aspects 15 directly (e.g., instead of through a wireless network and/or wired network 50) from the one or more sensors 240a of the computing device 10.

In some implementations, the sensor originated reported aspect providing operation 302 may include an operation 403 for acquiring the one or more reported aspects via at least one of a wireless network and a wired network as depicted in FIG. 4a. For instance, the sensor originated reported aspect network acquiring module 204 (see FIG. 2a) of the computing device 10 when the computing device 10 is a server (e.g., server embodiment) acquiring (e.g., receiving, soliciting for, searching for, and so forth) the one or more reported aspects 15 via at least one of a wireless network and a wired network 50.

In some implementations, the sensor originated reported aspect providing operation 302 may include an operation 404 for acquiring the one or more reported aspects from a memory as depicted in FIG. 4a. For instance, the sensor originated reported aspect memory acquiring module 206 (see FIG. 2a) of the computing device 10 acquiring (e.g., retrieving, finding, locating, and so forth) the one or more reported aspects 15 from a memory 116.

Various types of source user aspects may be indicated by the one or more reported aspects 15 that are provided through the sensor originated reported aspect providing operation 302 of FIG. 3 For example, in some implementations, the sensor originated reported aspect providing operation 302 may include an operation 405 for providing the one or more reported aspects that were originally reported by the one or more sensors including one or more reported aspects that indicate one or more behavior incidences associated with the one or more source users as depicted in FIG. 4a. For instance, the sensor originated reported aspect providing module 102 of the computing device 10 providing the one or more reported aspects 15 that were originally reported by the one or more sensors 240* including one or more reported aspects 15 that indicate one or more behavior incidences associated with the one or more source users 2*.

In various implementations, operation 405 may include one or more additional operations. For example, in some implementations, operation 405 may include an operation 406 for providing the one or more reported aspects that were originally reported by the one or more sensors including one or more reported aspects that indicate one or more incidences of activities executed by the one or more source users as depicted in FIG. 4a. For instance, the sensor originated reported aspect providing module 102 of the computing device 10 providing the one or more reported aspects 15 that were originally reported by the one or more sensors 240* including one or more reported aspects 15 that indicate one or more incidences of activities (e.g., dietary activities, exercise activities, social activities, medical treatment activities including drug consumption, and so forth) executed by the one or more source users 2*.

In the same or different implementations, operation 405 may include an operation 407 for providing the one or more reported aspects that were originally reported by the one or more sensors including one or more reported aspects that indicate one or more user attitudes or conduct associated with the one or more source users as depicted in FIG. 4a. For instance, the sensor originated reported aspect providing module 102 of the computing device 10 providing the one or more reported aspects 15 that were originally reported by the one or more sensors 240* (e.g., fMRI, fNIR, and so forth) including one or more reported aspects 15 that indicate one or more user attitudes or conduct associated with the one or more source users 2*.

Other types of aspects may also be indicated by the one or more reported aspects 15 to be provided through the sensor originated reported aspect providing operation 302 of FIG. 3 in various alternative implementations. For example, in some implementations, the sensor originated reported aspect providing operation 302 may include an operation 408 for providing the one or more reported aspects that were originally reported by the one or more sensors including one or more reported aspects that indicate one or more incidences of one or more mental states associated with the one or more source users as depicted in FIG. 4a. For instance, the sensor originated reported aspect providing module 102 of the computing device 10 providing the one or more reported aspects 15 that were originally reported by the one or more sensors 240* including one or more reported aspects 15 that indicate one or more incidences of one or more mental states (e.g., anger, happiness or sadness, mental alertness, mental fatigue, jealousy, and so forth) associated with the one or more source users 2*.

Figure 4B:
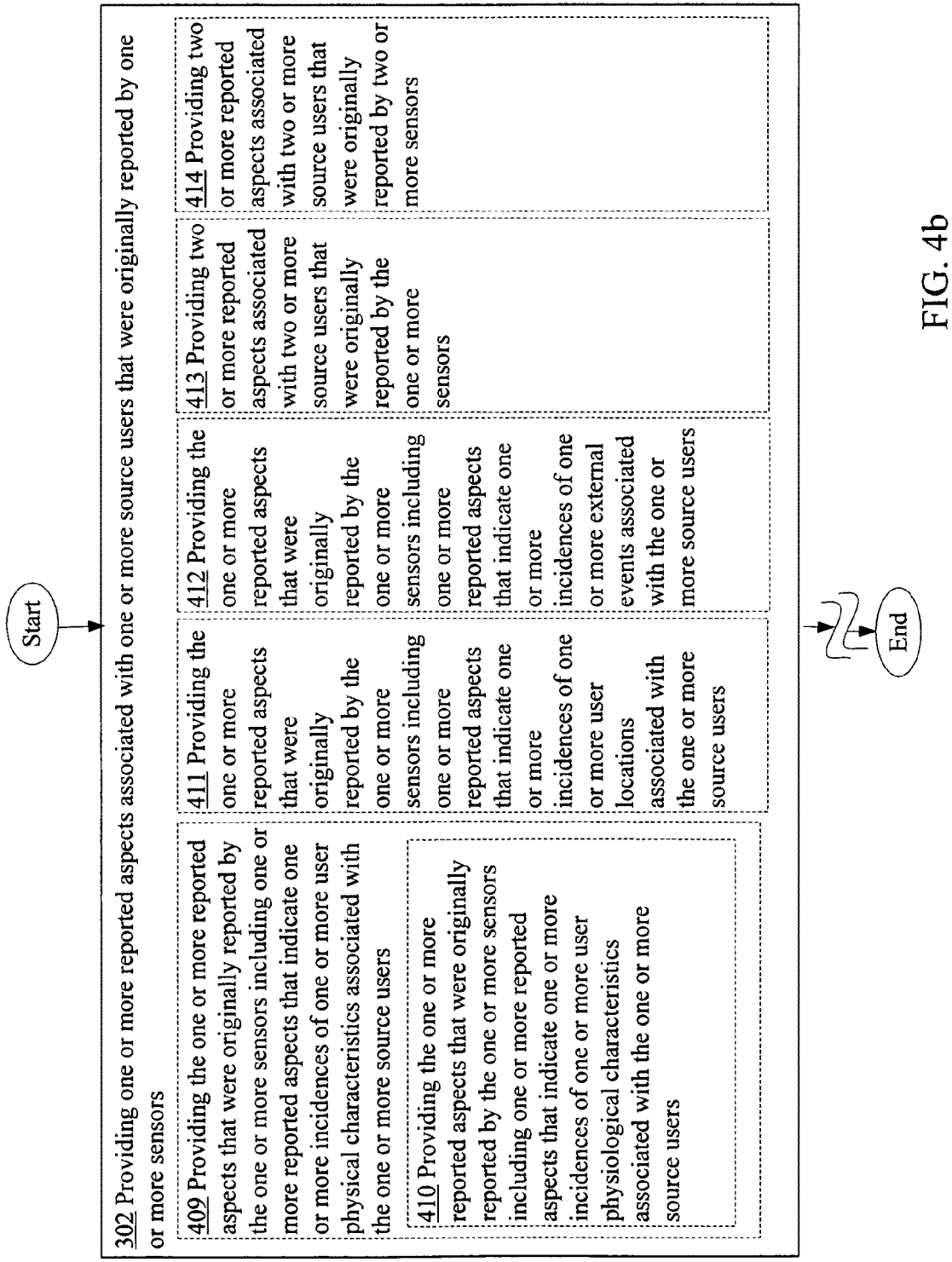
FIG. 4b is a high-level logic flowchart of a process depicting alternate implementations of the sensor originated reported aspect providing operation 302 of FIG. 3.

In the same or different implementations, the sensor originated reported aspect providing operation 302 of FIG. 3 may include an operation 409 for providing the one or more reported aspects that were originally reported by the one or more sensors including one or more reported aspects that indicate one or more incidences of one or more user physical characteristics associated with the one or more source users as depicted in FIG. 4b. For instance, the sensor originated reported aspect providing module 102 of the computing device 10 providing the one or more reported aspects 15 that were originally reported by the one or more sensors 240* including one or more reported aspects 15 that indicate one or more incidences of one or more user physical characteristics (e.g., hair color, skin complexion, hair style, tattoos, blood pressure, body weight, body fat level, and so forth) associated with the one or more source users 2*.

In various implementations, operation 409 may include an operation 410 for providing the one or more reported aspects that were originally reported by the one or more sensors including one or more reported aspects that indicate one or more incidences of one or more user physiological characteristics associated with the one or more source users as depicted in FIG. 4b. For instance, the sensor originated reported aspect providing module 102 of the computing device 10 providing the one or more reported aspects 15 that were originally reported by the one or more sensors 240* including one or more reported aspects 15 that indicate one or more incidences of one or more user physiological characteristics (e.g., heart rate, blood glucose level, blood circulation or volume, brain electrical activity, heart rate, and so forth) associated with the one or more source users 2*.

In the same or different implementations, the sensor originated reported aspect providing operation 302 may include an operation 411 for providing the one or more reported aspects that were originally reported by the one or more sensors including one or more reported aspects that indicate one or more incidences of one or more user locations associated with the one or more source users as depicted in FIG. 4b. For instance, the sensor originated reported aspect providing module 102 of the computing device 10 providing the one or more reported aspects 15 that were originally reported by the one or more sensors 240* including one or more reported aspects 15 that indicate one or more incidences of one or more user locations (e.g., home, workplace, school, New York City, Italy, and so forth) associated with the one or more source users 2*.

In the same or different implementations, the sensor originated reported aspect providing operation 302 of FIG. 3 may include an operation 412 for providing the one or more reported aspects that were originally reported by the one or more sensors including one or more reported aspects that indicate one or more incidences of one or more external events associated with the one or more source users as depicted in FIG. 4b. For instance, the sensor originated reported aspect providing module 102 of the computing device 10 providing the one or more reported aspects 15 that were originally reported by the one or more sensors 240* including one or more reported aspects 15 that indicate one or more incidences of one or more external events (e.g., local weather or atmospheric conditions, air or water quality levels, traffic conditions, and so forth) associated with the one or more source users 2*.

The one or more reported aspects 15 provided through the sensor originated reported aspect providing operation 302 of FIG. 3 may in some cases include two or more reported aspects associated with two or more source users. For example, in some implementations, the sensor originated reported aspect providing operation 302 may include an operation 413 for providing two or more reported aspects associated with two or more source users that were originally reported by the one or more sensors as depicted in FIG. 4b. For instance, the sensor originated reported aspect providing module 102 of the computing device 10 providing two or more reported aspects 15 associated with two or more source users 2* that were originally reported by one or more sensors 240*.

In some implementations, the sensor originated reported aspect providing operation 302 may include an operation 414 for providing two or more reported aspects associated with two or more source users that were originally reported by two or more sensors as depicted in FIG. 4b. For instance, the sensor originated reported aspect providing module 102 of the computing device 10 providing two or more reported aspects 15 associated with two or more source users 2* that were originally reported by two or more sensors 240*.

Figure 4C:
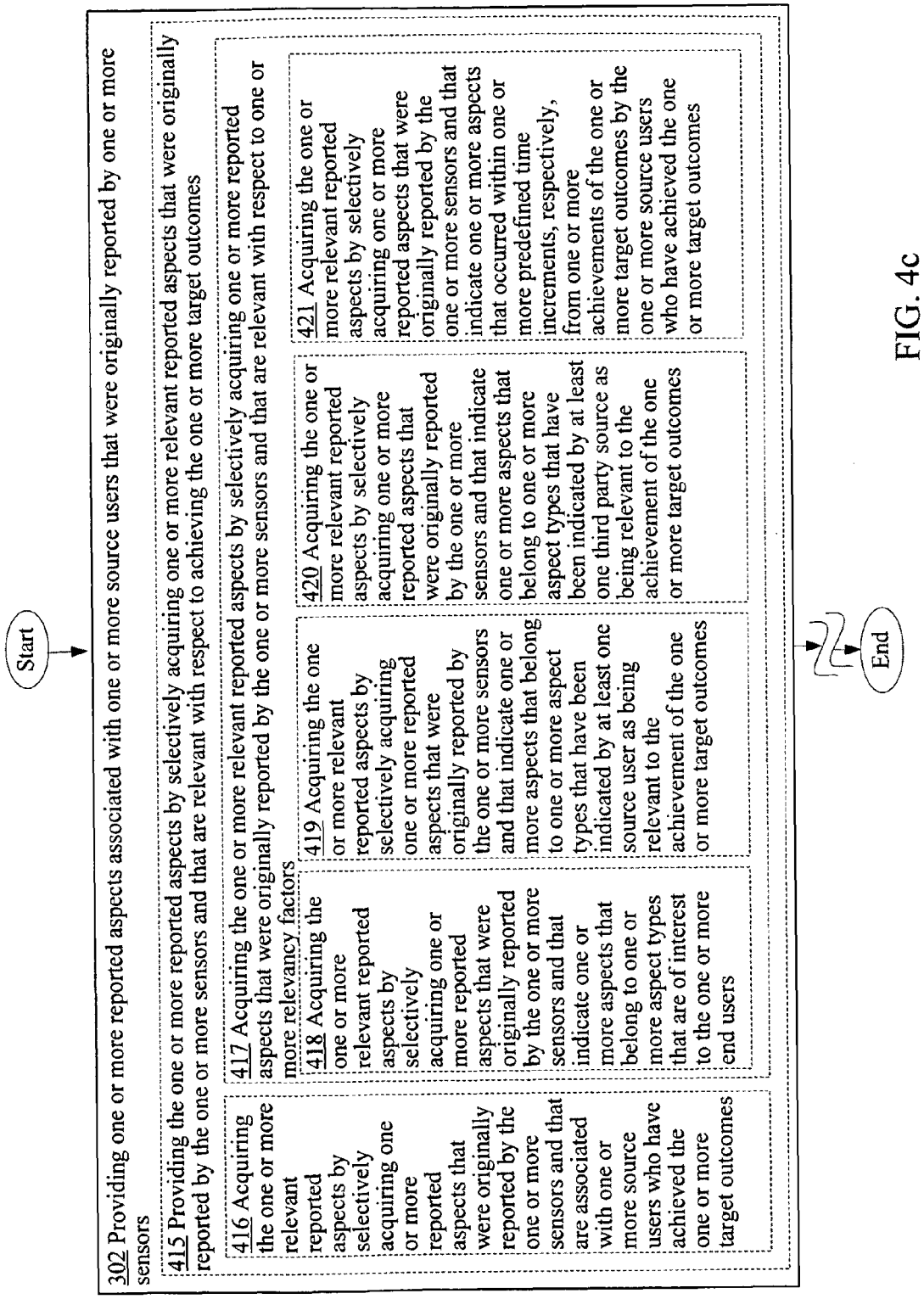
FIG. 4c is a high-level logic flowchart of a process depicting alternate implementations of the sensor originated reported aspect providing operation 302 of FIG. 3.

In certain implementations, the sensor originated reported aspect providing operation 302 may involve selectively acquiring relevant reported aspects 16 that are relevant with respect to achieving one or more target outcomes rather than merely acquiring, for example, any reported aspects 15 that are determined to be associated with the one or more source users 2* and that were originally reported by the one or more sensors 240*. For example, in some implementations, the sensor originated reported aspect providing operation 302 may include an operation 415 for providing the one or more reported aspects by selectively acquiring one or more relevant reported aspects that were originally reported by the one or more sensors and that are relevant with respect to achieving the one or more target outcomes as depicted in FIG. 4c. For instance, the sensor originated reported aspect providing module 102 of the computing device 10 providing the one or more reported aspects 15 by having the relevant reported aspect acquiring module 208 (see FIG. 2a) selectively acquiring (e.g., retrieving, finding, locating and so forth) one or more relevant reported aspects 16 that were originally reported by the one or more sensors 240* and that are relevant with respect to achieving the one or more target outcomes.

Operation 415 for selectively acquiring the one or more relevant reported aspects may be executed in a number of different ways in various alternative implementations. For example, in some implementations, operation 415 may include an operation 416 for acquiring the one or more relevant reported aspects by selectively acquiring one or more reported aspects that were originally reported by the one or more sensors and that are associated with one or more source users who have achieved the one or more target outcomes as depicted in FIG. 4c. For instance, the relevant reported aspect acquiring module 208 of the computing device 10 acquiring the one or more relevant reported aspects 16 by having the source user associated reported aspect acquiring module 210 selectively acquiring one or more reported aspects 15 that were originally reported by the one or more sensors 240* and that are associated with one or more source users 2* who have achieved the one or more target outcomes. Note that if it is not known which source users 2* may have achieved the one or more target outcomes then a process may be executed to first find reported aspects 15 that correspond (e.g., equivalent or substantially equivalent) to the one or more target outcomes, and second, upon finding such corresponding reported aspects 15, identify the source users 2* who are associated with the corresponding reported aspects. By doing so, those source users 2* who have achieved the one or more target outcomes are identified.

In the same or different implementations, operation 415 may include an operation 417 for acquiring the one or more relevant reported aspects by selectively acquiring one or more reported aspects that were originally reported by the one or more sensors and that are relevant with respect to one or more relevancy factors as depicted in FIG. 4c. For instance, the relevant reported aspect acquiring module 208 of the computing device 10 acquiring the one or more relevant reported aspects 16 by having the relevancy factor relevant reported aspect acquiring module 212 (e.g., see FIG. 2a) selectively acquiring one or more reported aspects 15 that were originally reported by the one or more sensors 240* and that are relevant with respect to one or more relevancy factors.

Various types of relevancy factors may be considered in operation 417 in order to acquire the one or more relevant reported aspects 16. For example, in some implementations, operation 417 may include an operation 418 for acquiring the one or more relevant reported aspects by selectively acquiring one or more reported aspects that were originally reported by the one or more sensors and that indicate one or more aspects that belong to one or more aspect types that are of interest to the one or more end users as depicted in FIG. 4c. For instance, the relevant reported aspect acquiring module 208 of the computing device 10 acquiring the one or more relevant reported aspects 16 by having the relevancy factor relevant reported aspect acquiring module 212 (e.g., see FIG. 2a) selectively acquiring one or more reported aspects 15 that were originally reported by the one or more sensors 240* and that indicate one or more aspects that belong to one or more aspect types (e.g., dietary activities, mental states, exercise activities, rest activities, and so forth) that are of interest to the one or more end users 4*.

In the same or different implementations, operation 417 may include an operation 419 for acquiring the one or more relevant reported aspects by selectively acquiring one or more reported aspects that were originally reported by the one or more sensors and that indicate one or more aspects that belong to one or more aspect types that have been indicated by at least one source user as being relevant to the achievement of the one or more target outcomes as depicted in FIG. 4c. For instance, the relevant reported aspect acquiring module 208 of the computing device 10 acquiring the one or more relevant reported aspects 16 by having the relevancy factor relevant reported aspect acquiring module 212 (e.g., see FIG. 2a) selectively acquiring one or more reported aspects 15 that were originally reported by the one or more sensors 240* and that indicate one or more aspects that belong to one or more aspect types (e.g., social activities, sleep patterns, bathroom usage, physical appearance, and so forth) that have been indicated by at least one source user 2* as being relevant to the achievement of the one or more target outcomes.

In the same or different implementations, operation 417 may include an operation 420 for acquiring the one or more relevant reported aspects by selectively acquiring one or more reported aspects that were originally reported by the one or more sensors and that indicate one or more aspects that belong to one or more aspect types that have been indicated by at least one third party source as being relevant to the achievement of the one or more target outcomes as depicted in FIG. 4c. For instance, the relevant reported aspect acquiring module 208 of the computing device 10 acquiring the one or more relevant reported aspects 16 by having the relevancy factor relevant reported aspect acquiring module 212 (e.g., see FIG. 2a) selectively acquiring one or more reported aspects 15 that were originally reported by the one or more sensors 240* and that indicate one or more aspects that belong to one or more aspect types that have been indicated by at least one third party source as (e.g., a third party 6, a publication as provided by a third party 6, a content provider, and so forth) being relevant to the achievement of the one or more target outcomes.

In the same or different implementations, operation 417 may include an operation 421 for acquiring the one or more relevant reported aspects by selectively acquiring one or more reported aspects that were originally reported by the one or more sensors and that indicate one or more aspects that occurred within one or more predefined time increments, respectively, from one or more achievements of the one or more target outcomes by the one or more source users who have achieved the one or more target outcomes as depicted in FIG. 4c. For instance, the relevant reported aspect acquiring module 208 of the computing device 10 acquiring the one or more relevant reported aspects 16 by having the relevancy factor relevant reported aspect acquiring module 212 (e.g., see FIG. 2a) selectively acquiring one or more reported aspects 15 that were originally reported by the one or more sensors 240* and that indicate one or more aspects that occurred within one or more predefined time increments, respectively, from one or more achievements (e.g., occurrences) of the one or more target outcomes by the one or more source users 2* who have achieved the one or more target outcomes.

That is, not all relevant reported aspects 16 that may be relevant with respect to certain relevancy factors may actually be relevant to achieving the one or more target outcomes if the relevant reported aspects 16 indicate aspects that, time-wise, occurred remotely from occurrence (or achievement) of the one or more target outcomes as successfully achieved by the one or more source users 2* who have achieved the one or more target outcomes. For example, reported aspects 15 that are associated with source users 2* who have achieved the one or more target outcomes and that are relevant based on certain relevancy factors (e.g., belong to a type of aspect that is of interest to the end user 4* such as dietary behavior) may, nevertheless, not be relevant to achieving the one or more target outcomes if they occurred well before (or well after) the achievement of the one or more target outcomes by the one or more source users 2*.

Thus, a reported aspect 15 may, in some cases, be relevant to the achievement of the one or more target outcomes only if it falls within some time increment (e.g., "predefined time increment") from one or more occurrences of one or more reported achievements by the one or more source users 2* (e.g., as reported through one or more reported aspects 15) of the one or more target outcomes. The length of the predefined time increments to be considered in determining relevancy may depend on a number of factors including, for example, the type of target outcomes being sought and/or the type of templates to be developed. In some implementations, the predefined time increments to be considered may be set by an end user 4*, by a source user 2*, and/or by a third party source (e.g., third party 6).

Figure 4D:
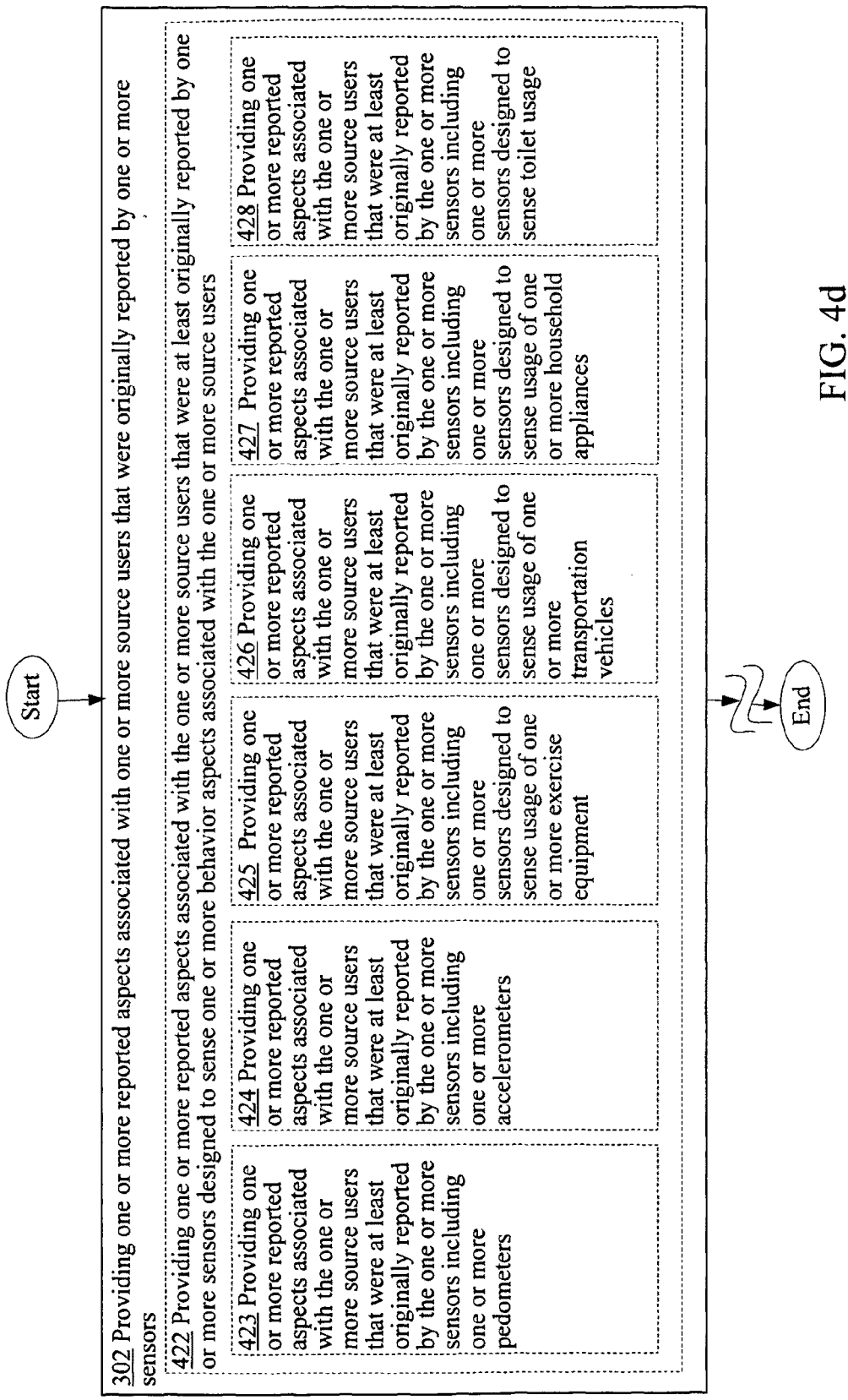
FIG. 4d is a high-level logic flowchart of a process depicting alternate implementations of the sensor originated reported aspect providing operation 302 of FIG. 3.

In various implementations, the one or more reported aspects 15 to be provided through the sensor originated reported aspect providing operation 302 of FIG. 3 may have been originally reported by a variety of sensors 240*. For example, in some implementations the sensor originated reported aspect providing operation 302 may include an operation 422 for providing one or more reported aspects associated with the one or more source users that were at least originally reported by one or more sensors designed to sense one or more behavior aspects associated with the one or more source users as depicted by FIG. 4d. For instance, the sensor originated reported aspect providing module 102 of the computing device 10 providing one or more reported aspects 15 associated with the one or more source users 2* that were at least originally reported by one or more sensors 240* (e.g., behavior aspect sensors 246) designed to sense one or more behavior aspects associated with the one or more source users 2*.

Various types of sensors 240* may be used in order to sense various behavior aspects associated with source users 2*. For example, in some implementations, operation 422 may include an operation 423 for providing one or more reported aspects associated with the one or more source users that were at least originally reported by the one or more sensors including one or more pedometers as depicted in FIG. 4d. For instance, the sensor originated reported aspect providing module 102 of the computing device 10 providing one or more reported aspects 15 associated with the one or more source users 2* that were at least originally reported by one or more sensors 240* including one or more pedometers 247.

In the same or different implementations, operation 422 may include an operation 424 for providing one or more reported aspects associated with the one or more source users that were at least originally reported by the one or more sensors including one or more accelerometers as depicted in FIG. 4d. For instance, the sensor originated reported aspect providing module 102 of the computing device 10 providing one or more reported aspects 15 associated with the one or more source users 2* that were at least originally reported by one or more sensors 240* including one or more accelerometers 248.

In the same or different implementations, operation 422 may include an operation 425 for providing one or more reported aspects associated with the one or more source users that were at least originally reported by the one or more sensors including one or more sensors designed to sense usage of one or more exercise equipment as depicted in FIG. 4d. For instance, the sensor originated reported aspect providing module 102 of the computing device 10 providing one or more reported aspects 15 associated with the one or more source users 2* that were at least originally reported by one or more sensors 240* including one or more sensors 240* (e.g., exercise equipment sensors 249) designed to sense usage of one or more exercise equipment (e.g., bicycle, treadmill, elliptical exercise machines, and so forth).

In the same or different implementations, operation 422 may include an operation 426 for providing one or more reported aspects associated with the one or more source users that were at least originally reported by the one or more sensors including one or more sensors designed to sense usage of one or more transportation vehicles as depicted in FIG. 4d. For instance, the sensor originated reported aspect providing module 102 of the computing device 10 providing one or more reported aspects 15 associated with the one or more source users 2* that were at least originally reported by one or more sensors 240* including one or more sensors 240* (e.g., transport vehicle sensors 250) designed to sense usage of one or more transportation vehicles.

In the same or different implementations, operation 422 may include an operation 427 for providing one or more reported aspects associated with the one or more source users that were at least originally reported by the one or more sensors including one or more sensors designed to sense usage of one or more household appliances as depicted in FIG. 4d. For instance, the sensor originated reported aspect providing module 102 of the computing device 10 providing one or more reported aspects 15 associated with the one or more source users 2* that were at least originally reported by one or more sensors 240* including one or more sensors 240* (e.g., household appliance sensors 251) designed to sense usage of one or more household appliances.

In the same or different implementations, operation 422 may include an operation 428 for providing one or more reported aspects associated with the one or more source users that were at least originally reported by the one or more sensors including one or more sensors designed to sense toilet usage as depicted in FIG. 4d. For instance, the sensor originated reported aspect providing module 102 of the computing device 10 providing one or more reported aspects 15 associated with the one or more source users 2* that were at least originally reported by one or more sensors 240* including one or more sensors 240* (e.g., toilet usage sensors 252) designed to sense toilet usage.

Figure 4E:
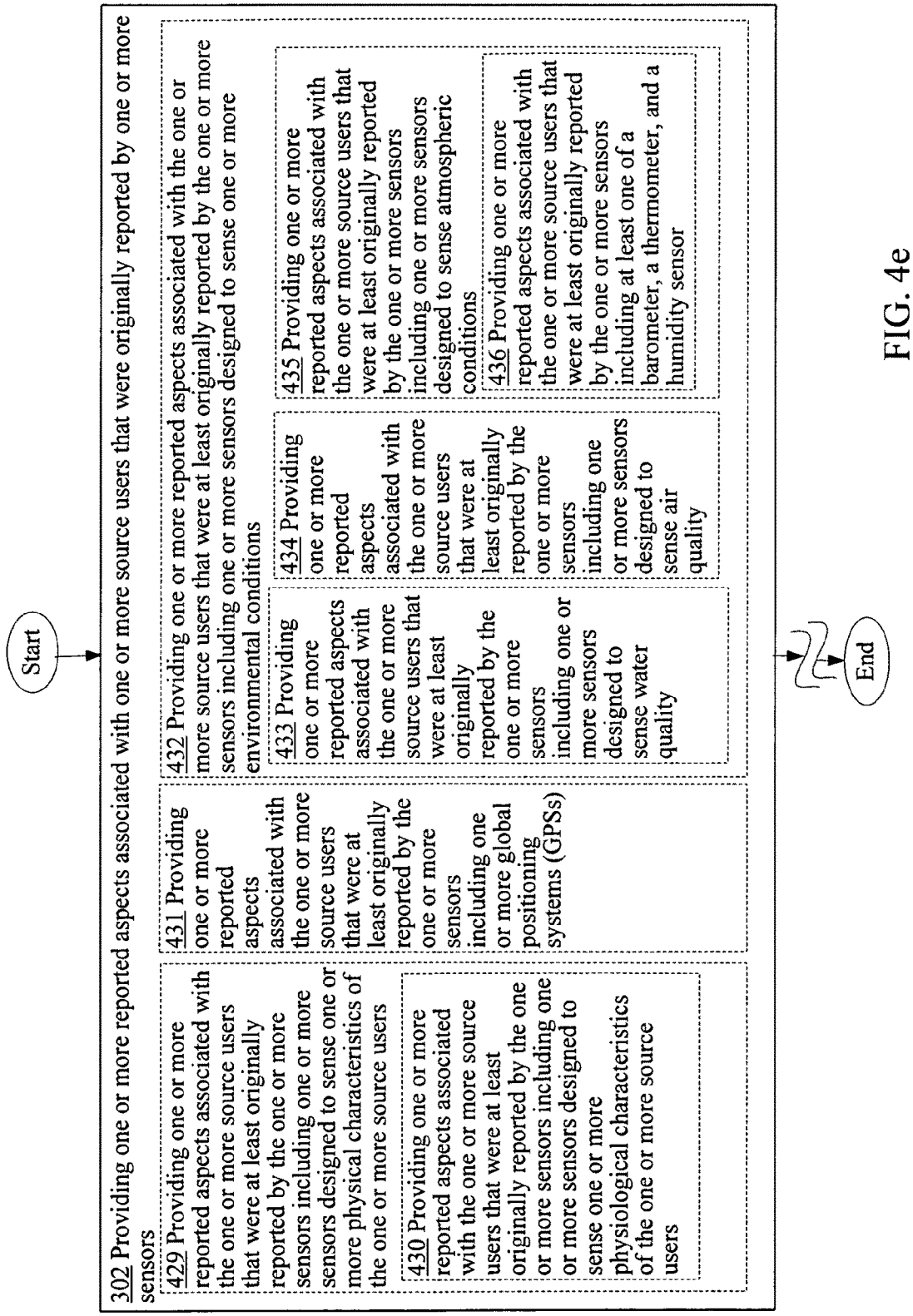
FIG. 4e is a high-level logic flowchart of a process depicting alternate implementations of the sensor originated reported aspect providing operation 302 of FIG. 3.

In some implementations, the sensor originated reported aspect providing operation 302 of FIG. 3 may include an operation 429 for providing one or more reported aspects associated with the one or more source users that were at least originally reported by the one or more sensors including one or more sensors designed to sense one or more physical characteristics of the one or more source users as depicted in FIG. 4e. For instance, the sensor originated reported aspect providing module 102 of the computing device 10 providing one or more reported aspects 15 associated with the one or more source users 2* that were at least originally reported by one or more sensors 240* including one or more sensors 240* (e.g., user physical characteristic sensors 253) designed to sense one or more physical characteristics of the one or more source users 2*.

In some cases, operation 429 may further include an operation 430 for providing one or more reported aspects associated with the one or more source users that were at least originally reported by the one or more sensors including one or more sensors designed to sense one or more physiological characteristics of the one or more source users as depicted in FIG. 4e. For instance, the sensor originated reported aspect providing module 102 of the computing device 10 providing one or more reported aspects 15 associated with the one or more source users 2* that were at least originally reported by one or more sensors 240* including one or more sensors 240* (e.g., user physiological sensors 254) designed to sense one or more physiological characteristics of the one or more source users 2*. Examples of user physiological sensors 254 include, for example, blood pressure monitors, blood glucose meters, heart rate monitors, functional near-infrared (fNIR) devices, functional magnetic resonance imaging (fMRI) devices, and so forth).

In some implementations, the sensor originated reported aspect providing operation 302 of FIG. 3 may include an operation 431 for providing one or more reported aspects associated with the one or more source users that were at least originally reported by the one or more sensors including one or more global positioning systems (GPSs) as depicted in FIG. 4e. For instance, the sensor originated reported aspect providing module 102 of the computing device 10 providing one or more reported aspects 15 associated with the one or more source users 2* that were at least originally reported by one or more sensors 240* including one or more global positioning systems (GPSs) 255.

In some implementations, the sensor originated reported aspect providing operation 302 may include an operation 432 for providing one or more reported aspects associated with the one or more source users that were at least originally reported by the one or more sensors including one or more sensors designed to sense one or more environmental conditions as depicted in FIG. 4e. For instance, the sensor originated reported aspect providing module 102 of the computing device 10 providing one or more reported aspects 15 associated with the one or more source users 2* that were at least originally reported by one or more sensors 240* including one or more sensors 240* (e.g., environmental condition sensors 256) designed to sense one or more environmental conditions (e.g., source user environmental conditions).

Operation 432 may, in turn, further include an operation 433 for providing one or more reported aspects associated with the one or more source users that were at least originally reported by the one or more sensors including one or more sensors designed to sense water quality as depicted in FIG. 4e. For instance, the sensor originated reported aspect providing module 102 of the computing device 10 providing one or more reported aspects 15 associated with the one or more source users 2* that were at least originally reported by one or more sensors 240* including one or more sensors 240* (e.g., water quality sensors 259) designed to sense water quality (e.g., qualities of drinking water consumed by the one or more source users 2*).

In the same or different implementations, operation 432 may include an operation 434 for providing one or more reported aspects associated with the one or more source users that were at least originally reported by the one or more sensors including one or more sensors designed to sense air quality as depicted in FIG. 4e. For instance, the sensor originated reported aspect providing module 102 of the computing device 10 providing one or more reported aspects 15 associated with the one or more source users 2* that were at least originally reported by one or more sensors 240* including one or more sensors 240* (e.g., air quality sensors 257 such as particulate or pollen counter, gas detectors, and so forth) designed to sense air quality.

In the same or different implementations, operation 432 may include an operation 435 for providing one or more reported aspects associated with the one or more source users that were at least originally reported by the one or more sensors including one or more sensors designed to sense atmospheric conditions as depicted in FIG. 4e. For instance, the sensor originated reported aspect providing module 102 of the computing device 10 providing one or more reported aspects 15 associated with the one or more source users 2* that were at least originally reported by one or more sensors 240* including one or more sensors 240* (e.g., atmospheric condition sensors 258) designed to sense atmospheric conditions.

Various types of sensors 240* may be employed in order to sense a variety of atmospheric conditions. For example, in some implementations, operation 435 may further include an operation 436 for providing one or more reported aspects associated with the one or more source users that were at least originally reported by the one or more sensors including at least one of a barometer, a thermometer, and a humidity sensor as depicted in FIG. 4e. For instance, the sensor originated reported aspect providing module 102 of the computing device 10 providing one or more reported aspects 15 associated with the one or more source users 2* that were at least originally reported by one or more sensors 240* including at least one of a barometer, a thermometer, and a humidity sensor.

Figure 4F:
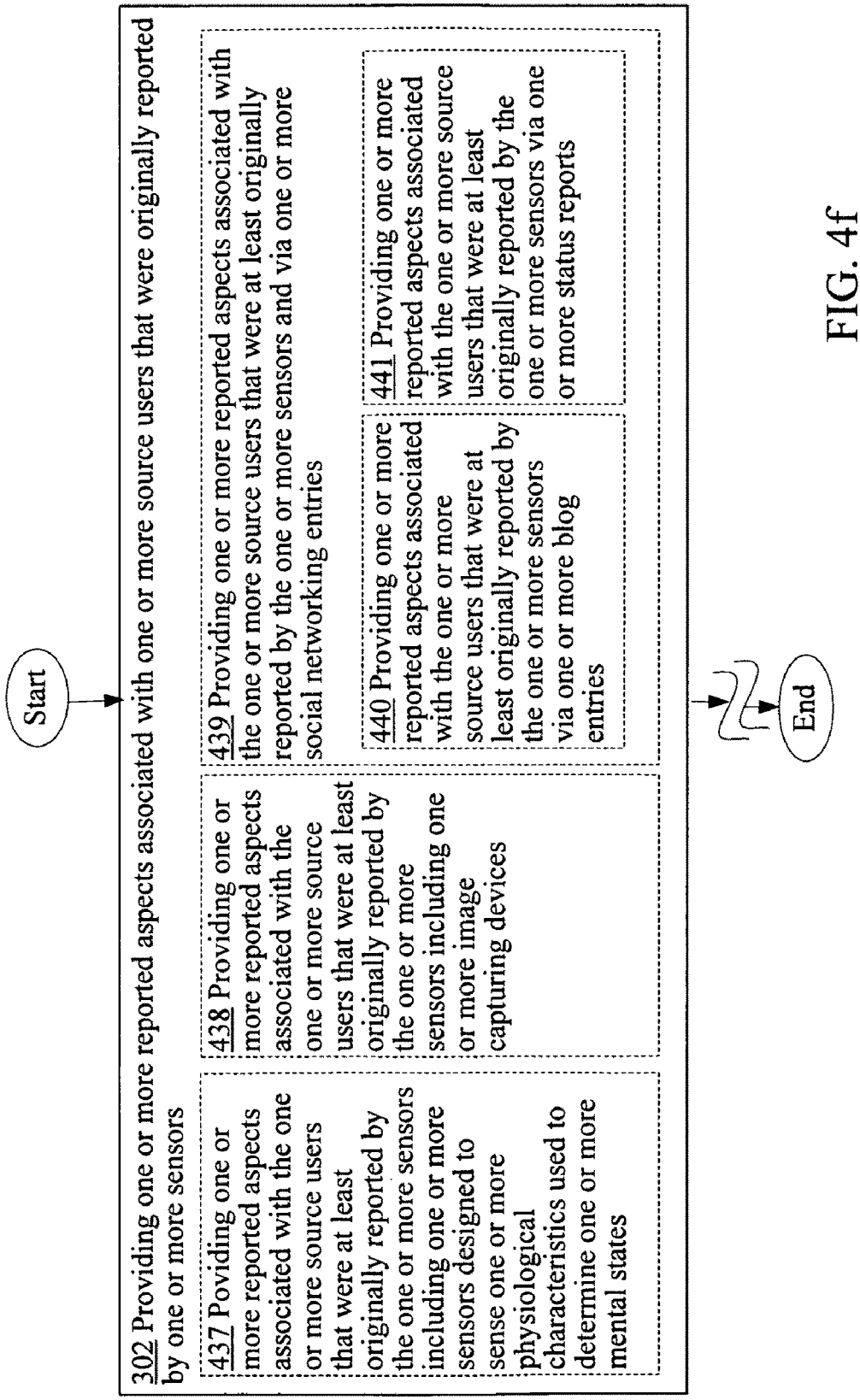
FIG. 4f is a high-level logic flowchart of a process depicting alternate implementations of the sensor originated reported aspect providing operation 302 of FIG. 3.

In some implementations, the sensor originated reported aspect providing operation 302 of FIG. 3 may include an operation 437 for providing one or more reported aspects associated with the one or more source users that were at least originally reported by the one or more sensors including one or more sensors designed to sense one or more physiological characteristics used to determine one or more mental states as depicted in FIG. 4f. For instance, the sensor originated reported aspect providing module 102 of the computing device 10 providing one or more reported aspects 15 associated with the one or more source users 2* that were at least originally reported by one or more sensors 240* including one or more sensors 240* (e.g., mental state sensors 260) designed to sense one or more physiological characteristics used to determine one or more mental states. Examples of mental state sensors 260 that can sense one or more physiological characteristics that may be used in order to determine mental states include, for example, fNIR devices, fMRI devices, electroencephalography (EEG) devices, magnetoencephalography (MEG) devices, galvanic skin sensor devices, respiration sensor devices, and so forth).

In some implementations, the sensor originated reported aspect providing operation 302 of FIG. 3 may include an operation 438 for providing one or more reported aspects associated with the one or more source users that were at least originally reported by the one or more sensors including one or more image capturing devices as depicted in FIG. 4f. For instance, the sensor originated reported aspect providing module 102 of the computing device 10 providing one or more reported aspects 15 associated with the one or more source users 2* that were at least originally reported by one or more sensors 240* including one or more image capturing devices 261 (e.g., digital camera, digital camcorder, ultrasound devices, and so forth). Such image capturing devices 261 may be employed in some implementations in order to capture images of various aspects (e.g., user activities or facial expressions) associated with one or more source users 2*. In some cases, data provided by such image capturing devices 261 may be interpreted using, for example, image interpretation software (e.g., facial recognition applications).

In various implementations, the sensor originated reported aspect providing operation 302 of FIG. 3 may include an operation 439 for providing one or more reported aspects associated with the one or more source users that were at least originally reported by the one or more sensors and via one or more social networking entries as depicted in FIG. 4f. For instance, the sensor originated reported aspect providing module 102 of the computing device 10 providing one or more reported aspects 15 associated with the one or more source users 2* that were at least originally reported by one or more sensors 240* and via one or more social networking entries.

In some implementations, operation 439 may further include an operation 440 for providing one or more reported aspects associated with the one or more source users that were at least originally reported by the one or more sensors via one or more blog entries as depicted in FIG. 4f. For instance, the sensor originated reported aspect providing module 102 of the computing device 10 providing one or more reported aspects 15 associated with the one or more source users 2* that were at least originally reported by the one or more sensors 240* via one or more blog entries (e.g., microblog entries).

In the same or different implementations, operation 439 may include an operation 441 for providing one or more reported aspects associated with the one or more source users that were at least originally reported by the one or more sensors via one or more status reports as depicted in FIG. 4f. For instance, the sensor originated reported aspect providing module 102 of the computing device 10 providing one or more reported aspects 15 associated with the one or more source users 2* that were at least originally reported by the one or more sensors 240* via one or more status reports (e.g., social networking status reports).

Figure 5A:
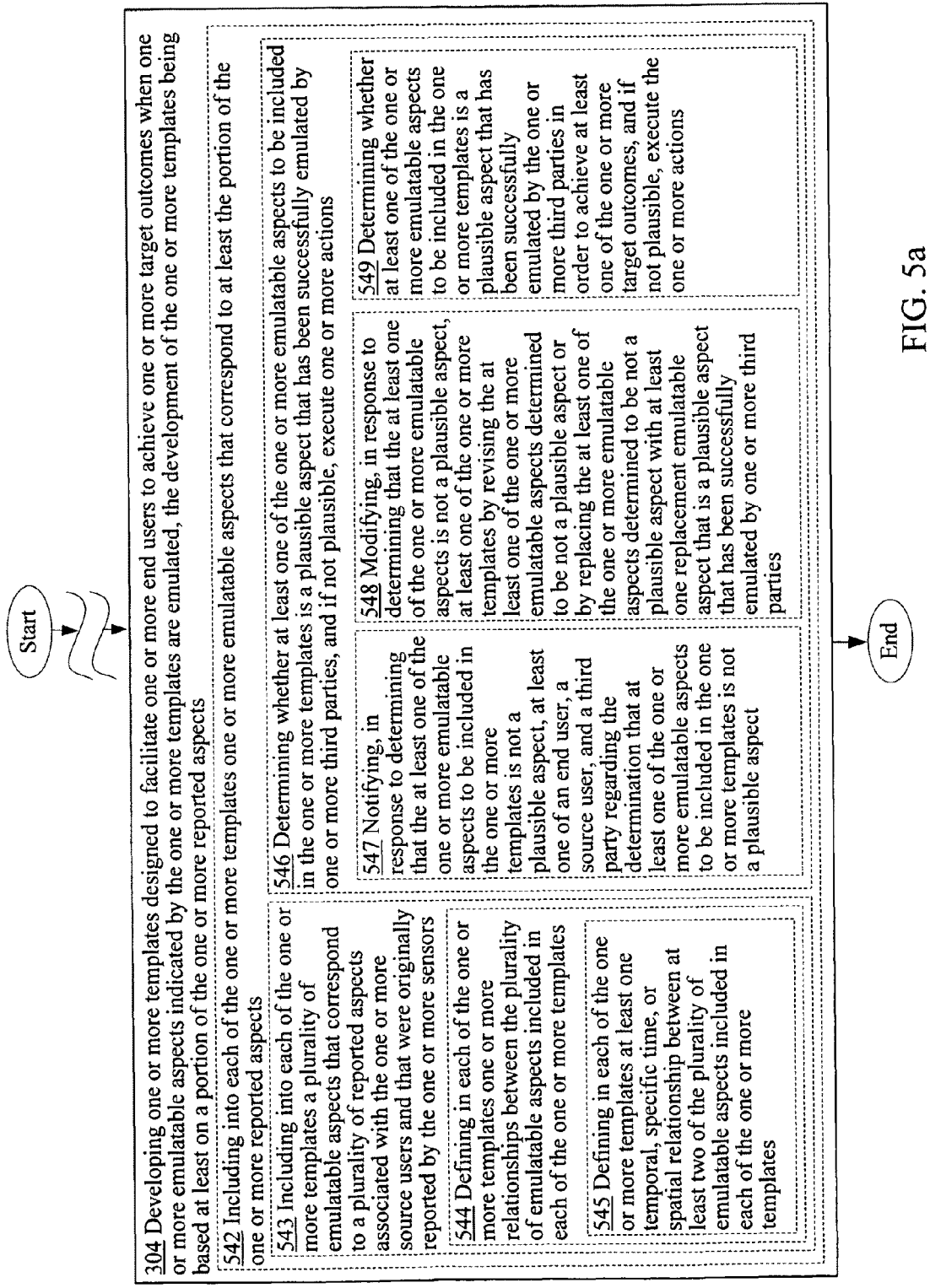
FIG. 5a is a high-level logic flowchart of a process depicting alternate implementations of the template developing operation 304 of FIG. 3.

Referring back to the template developing operation 304 of FIG. 3, the template developing operation 304, similar to the sensor originated reported aspect providing operation 302 of FIG. 3, may be executed in a number of different ways as illustrated in FIGS. 5a, 5b, 5c, and 5d. For example, in some implementations, the template developing operation 304 may include an operation 542 for including into each of the one or more templates one or more emulatable aspects that correspond to at least the portion of the one or more reported aspects as depicted in FIG. 5a. For instance, the emulatable aspect including module 220 (see FIG. 2b) of the computing device 10 including into each of the one or more templates 18 one or more emulatable aspects that correspond to at least the portion of the one or more reported aspects 15.

As further illustrated in FIG. 5a, operation 542 may further include one or more additional operations in various alternative implementations. For example, in some implementations, operation 542 may include an operation 543 for including into each of the one or more templates a plurality of emulatable aspects that correspond to a plurality of reported aspects associated with the one or more source users and that were originally reported by the one or more sensors as depicted in FIG. 5a. For instance, the emulatable aspect including module 220 of the computing device 10 including into each of the one or more templates 18 a plurality of emulatable aspects that correspond to a plurality of reported aspects 15 associated with the one or more source users 2* and that were originally reported by the one or more sensors 240*.

In various implementations, operation 543 may, in turn, further include an operation 544 for defining in each of the one or more templates one or more relationships between the plurality of emulatable aspects included in each of the one or more templates as depicted in FIG. 5a. For instance, the relationship defining module 222 (see FIG. 2b) of the computing device 10 defining in each of the one or more templates 18 at least one temporal, specific time, or spatial relationship between the plurality of emulatable aspects included in each of the one or more templates 18.

In some implementations, operation 544 may further include an operation 545 for defining in each of the one or more templates at least one temporal, specific time, or spatial relationship between at least two of the plurality of emulatable aspects included in each of the one or more templates as depicted in FIG. 5a. For instance, the relationship defining module 222 of the computing device 10 defining in each of the one or more templates 18 at least one temporal, specific time, or spatial relationship between at least two of the plurality of emulatable aspects included in each of the one or more templates 18.

In some cases, the operation 542 for including into each of the one or more templates 18 one or more emulatable aspects may include an operation 546 for determining whether at least one of the one or more emulatable aspects to be included in the one or more templates is a plausible aspect that has been successfully emulated by one or more third parties, and if not plausible, execute one or more actions as depicted in FIG. 5a. For instance, the plausible determining module 224 (see FIG. 2b) of the computing device 10 determining whether at least one of the one or more emulatable aspects to be included in the one or more templates 18 is a plausible aspect that has been successfully emulated by one or more third parties 6, and if not plausible, execute one or more actions (e.g., as executed by an action module 226 (see FIG. 2b).

Various types of actions may be executed upon a determination of non-plausibility. For example, in some implementations, operation 546 may include an operation 547 for notifying, in response to determining that the at least one of the one or more emulatable aspects to be included in the one or more templates is not a plausible aspect, at least one of an end user, a source user, and a third party regarding the determination that at least one of the one or more emulatable aspects to be included in the one or more templates is not a plausible aspect as depicted in FIG. 5a. For instance, the not plausible notification module 228 (see FIG. 2b) of the computing device 10 notifying (e.g., transmitting or indicating a notification), in response to determining that the at least one of the one or more emulatable aspects to be included in the one or more templates 18 is not a plausible aspect, at least one of an end user 4*, a source user 2*, and a third party 6 regarding the determination that at least one of the one or more emulatable aspects to be included in the one or more templates 18 is not a plausible aspect.

In the same or different implementations, operation 546 may include an operation 548 for modifying, in response to determining that the at least one of the one or more emulatable aspects is not a plausible aspect, at least one of the one or more templates by revising the at least one of the one or more emulatable aspects determined to be not a plausible aspect or by replacing the at least one of the one or more emulatable aspects determined to be not a plausible aspect with at least one replacement emulatable aspect that is a plausible aspect that has been successfully emulated by one or more third parties as depicted in FIG. 5a. For instance, the template modification module 229 (see FIG. 2b) of the computing device 10 modifying, in response to determining that the at least one of the one or more emulatable aspects is not a plausible aspect, at least one of the one or more templates 18 by revising the at least one of the one or more emulatable aspects determined to be not a plausible aspect or by replacing the at least one of the one or more emulatable aspects determined to be not a plausible aspect with at least one replacement emulatable aspect that is a plausible aspect that has been successfully emulated by one or more third parties 6. Note that the one or more third parties 6, in various implementations, may merely be other end users 4* who may have previously attempted to emulate the one or more templates 18.

In the same or different implementations, operation 546 may include an operation 549 for determining whether at least one of the one or more emulatable aspects to be included in the one or more templates is a plausible aspect that has been successfully emulated by the one or more third parties in order to achieve at least one of the one or more target outcomes, and if not plausible, execute the one or more actions as depicted in FIG. 5a. For instance, the plausible determining module 224 of the computing device 10 determining whether at least one of the one or more emulatable aspects to be included in the one or more templates 18 is a plausible aspect that has been successfully emulated by the one or more third parties 6 in order to achieve at least one of the one or more target outcomes, and if not plausible, execute the one or more actions.

Figure 5B:
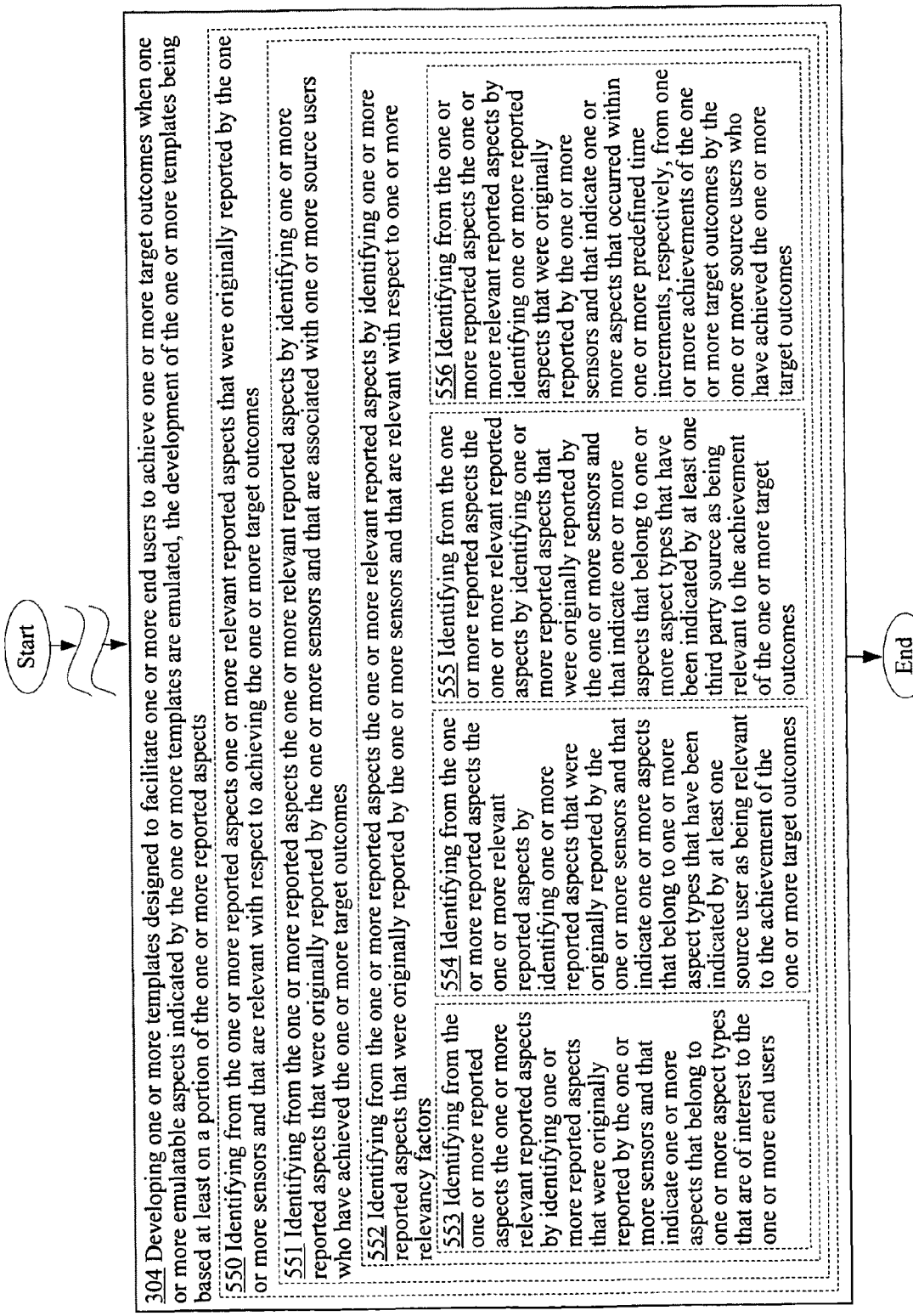
FIG. 5b is a high-level logic flowchart of a process depicting alternate implementations of the template developing operation 304 of FIG. 3.

In some cases, the template developing operation 304 of FIG. 3 may involve identifying from the one or more reported aspects that were provided through operation 302, one or more relevant reported aspects 16 that were at least originally reported by the one or more sensors 240* and that are relevant with respect to achieving the one or more target outcomes. For example, in some implementations, the template developing operation 304 may include an operation 550 for identifying from the one or more reported aspects one or more relevant reported aspects that were originally reported by the one or more sensors and that are relevant with respect to achieving the one or more target outcomes as depicted in FIG. 5b. For instance, the relevant reported aspect identification module 230 (see FIG. 2b) of the computing device 10 identifying from the one or more reported aspects 15 one or more relevant reported aspects 16 that were originally reported by the one or more sensors 240* and that are relevant with respect to achieving the one or more target outcomes.

Various operations may be employed in order to identify the relevant reported aspects 16 identified through operation 550. For example, in various implementations, operation 550 may include an operation 551 for identifying from the one or more reported aspects the one or more relevant reported aspects by identifying one or more reported aspects that were originally reported by the one or more sensors and that are associated with one or more source users who have achieved the one or more target outcomes as depicted in FIG. 5b. For instance, the relevant reported aspect identification module 230 of the computing device 10 identifying from the one or more reported aspects 15 the one or more relevant reported aspects 16 by having the source user associated reported aspect identification module 232 identifying one or more reported aspects 15 that were originally reported by the one or more sensors 240* and that are associated with one or more source users 2* who have achieved the one or more target outcomes.

Operation 551, in turn, may further include one or more additional operations in various alternative implementations. For example, in some implementations, operation 551 may include an operation 552 for identifying from the one or more reported aspects the one or more relevant reported aspects by identifying one or more reported aspects that were originally reported by the one or more sensors and that are relevant with respect to one or more relevancy factors as depicted in FIG. 5b. For instance, the relevant reported aspect identification module 230 of the computing device 10 identifying from the one or more reported aspects 15 the one or more relevant reported aspects 16 by having the relevancy factor relevant reported aspect identification module 234 identifying one or more reported aspects 15 that were originally reported by the one or more sensors 240* and that are relevant with respect to one or more relevancy factors.

In some implementations, operation 552 may further include an operation 553 for identifying from the one or more reported aspects the one or more relevant reported aspects by identifying one or more reported aspects that were originally reported by the one or more sensors and that indicate one or more aspects that belong to one or more aspect types that are of interest to the one or more end users as depicted in FIG. 5b. For instance, the relevant reported aspect identification module 230 of the computing device 10 identifying from the one or more reported aspects 15 the one or more relevant reported aspects 16 by having the relevancy factor relevant reported aspect identification module 234 identifying one or more reported aspects 15 that were originally reported by the one or more sensors 240* and that indicate one or more aspects that belong to one or more aspect types that are of interest to the one or more end users 4*.

In the same or different implementations, operation 552 may include an operation 554 for identifying from the one or more reported aspects the one or more relevant reported aspects by identifying one or more reported aspects that were originally reported by the one or more sensors and that indicate one or more aspects that belong to one or more aspect types that have been indicated by at least one source user as being relevant to the achievement of the one or more target outcomes as depicted in FIG. 5b. For instance, the relevant reported aspect identification module 230 of the computing device 10 identifying from the one or more reported aspects 15 the one or more relevant reported aspects 16 by having the relevancy factor relevant reported aspect identification module 234 identifying one or more reported aspects 15 that were originally reported by the one or more sensors 240* and that indicate one or more aspects that belong to one or more aspect types that have been indicated by at least one source user 2* as being relevant to the achievement of the one or more target outcomes.

In the same or different implementations, operation 552 may include an operation 555 for identifying from the one or more reported aspects the one or more relevant reported aspects by identifying one or more reported aspects that were originally reported by the one or more sensors and that indicate one or more aspects that belong to one or more aspect types that have been indicated by at least one third party source as being relevant to the achievement of the one or more target outcomes as depicted in FIG. 5b. For instance, the relevant reported aspect identification module 230 of the computing device 10 identifying from the one or more reported aspects 15 the one or more relevant reported aspects 16 by having the relevancy factor relevant reported aspect identification module 234 identifying one or more reported aspects 15 that were originally reported by the one or more sensors 240* and that indicate one or more aspects that belong to one or more aspect types that have been indicated by at least one third party source (e.g. a third party 6, a content provider, or a publication) as being relevant to the achievement of the one or more target outcomes.

In the same or different implementations, operation 552 may include an operation 556 for identifying from the one or more reported aspects the one or more relevant reported aspects by identifying one or more reported aspects that were originally reported by the one or more sensors and that indicate one or more aspects that occurred within one or more predefined time increments, respectively, from one or more achievements of the one or more target outcomes by the one or more source users who have achieved the one or more target outcomes as depicted in FIG. 5b. For instance, the relevant reported aspect identification module 230 of the computing device 10 identifying from the one or more reported aspects 15 the one or more relevant reported aspects 16 by having the relevancy factor relevant reported aspect identification module 234 identifying one or more reported aspects 15 that were originally reported by the one or more sensors 240* and that indicate one or more aspects that occurred within one or more predefined time increments, respectively, from one or more achievements (e.g., occurrences) of the one or more target outcomes by the one or more source users 2* who have achieved the one or more target outcomes.

Figure 5C:
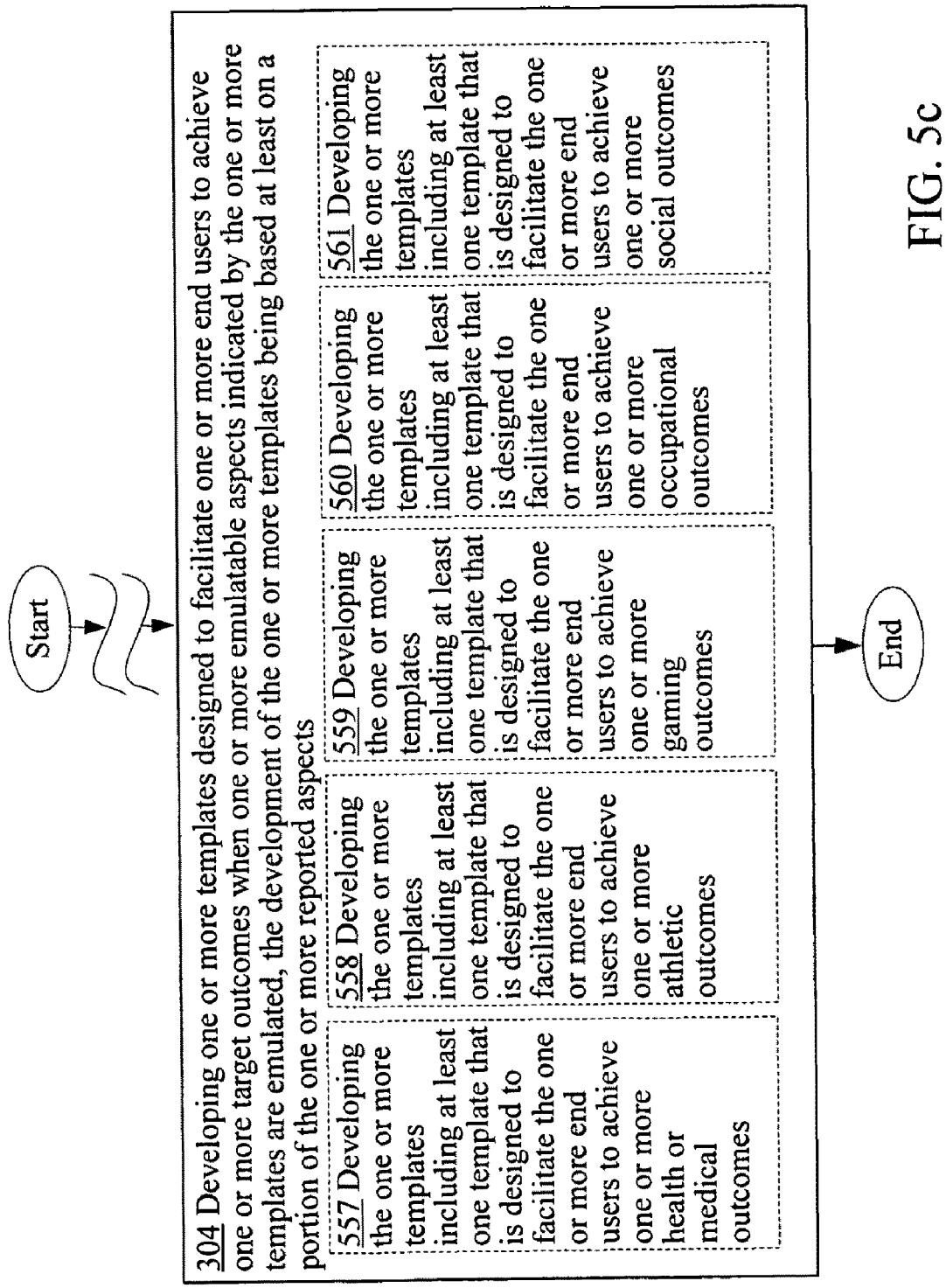
FIG. 5c is a high-level logic flowchart of a process depicting alternate implementations of the template developing operation 304 of FIG. 3.

Various types of templates 18 may be developed through the template developing operation 304 of FIG. 3 in various alternative implementations. For example, in some implementations, the template developing operation 304 of FIG. 3 may include an operation 557 for developing the one or more templates including at least one template that is designed to facilitate the one or more end users to achieve one or more health or medical outcomes as depicted in FIG. 5c. For instance, the template development module 104 of the computing device 10 developing the one or more templates 18 including at least one template 18 that is designed to facilitate one or more end users 4* to achieve one or more health or medical outcomes (e.g., recover from a particular illness, avoid acquiring certain illnesses such as cancer or influenza, obtain improved physiological traits, improve mental health, and so forth).

In the same or different implementations, the template developing operation 304 may include an operation 558 for developing the one or more templates including at least one template that is designed to facilitate the one or more end users to achieve one or more athletic outcomes as depicted in FIG. 5c. For instance, the template development module 104 of the computing device 10 developing the one or more templates 18 including at least one template 18 that is designed to facilitate one or more end users 4* to achieve one or more athletic outcomes (e.g., finish a marathon, achieve a certain golf score, win a tennis tournament, and so forth).

In the same or different implementations, the template developing operation 304 may include an operation 559 for developing the one or more templates including at least one template that is designed to facilitate the one or more end users to achieve one or more gaming outcomes as depicted in FIG. 5c. For instance, the template development module 104 of the computing device 10 developing the one or more templates 18 including at least one template 18 that is designed to facilitate one or more end users 4* to achieve one or more gaming outcomes (e.g., achieve a certain chase ranking, become proficient at a particular electronic game, and so forth).

In the same or different implementations, the template developing operation 304 may include an operation 560 for developing the one or more templates including at least one template that is designed to facilitate the one or more end users to achieve one or more occupational outcomes as depicted in FIG. 5c. For instance, the template development module 104 of the computing device 10 developing the one or more templates 18 including at least one template 18 that is designed to facilitate one or more end users 4* to achieve one or more occupational outcomes (e.g., finish a work project, get a promotion, develop a certain computer skill, develop a personal work network, and so forth).

In the same or different implementations, the template developing operation 304 may include an operation 561 for developing the one or more templates including at least one template that is designed to facilitate the one or more end users to achieve one or more social outcomes as depicted in FIG. 5c. For instance, the template development module 104 of the computing device 10 developing the one or more templates 18 including at least one template 18 that is designed to facilitate one or more end users 4* to achieve one or more social outcomes (e.g., going out on a date, receive an invitation to join a particular social club, and so forth).

Figure 5D:
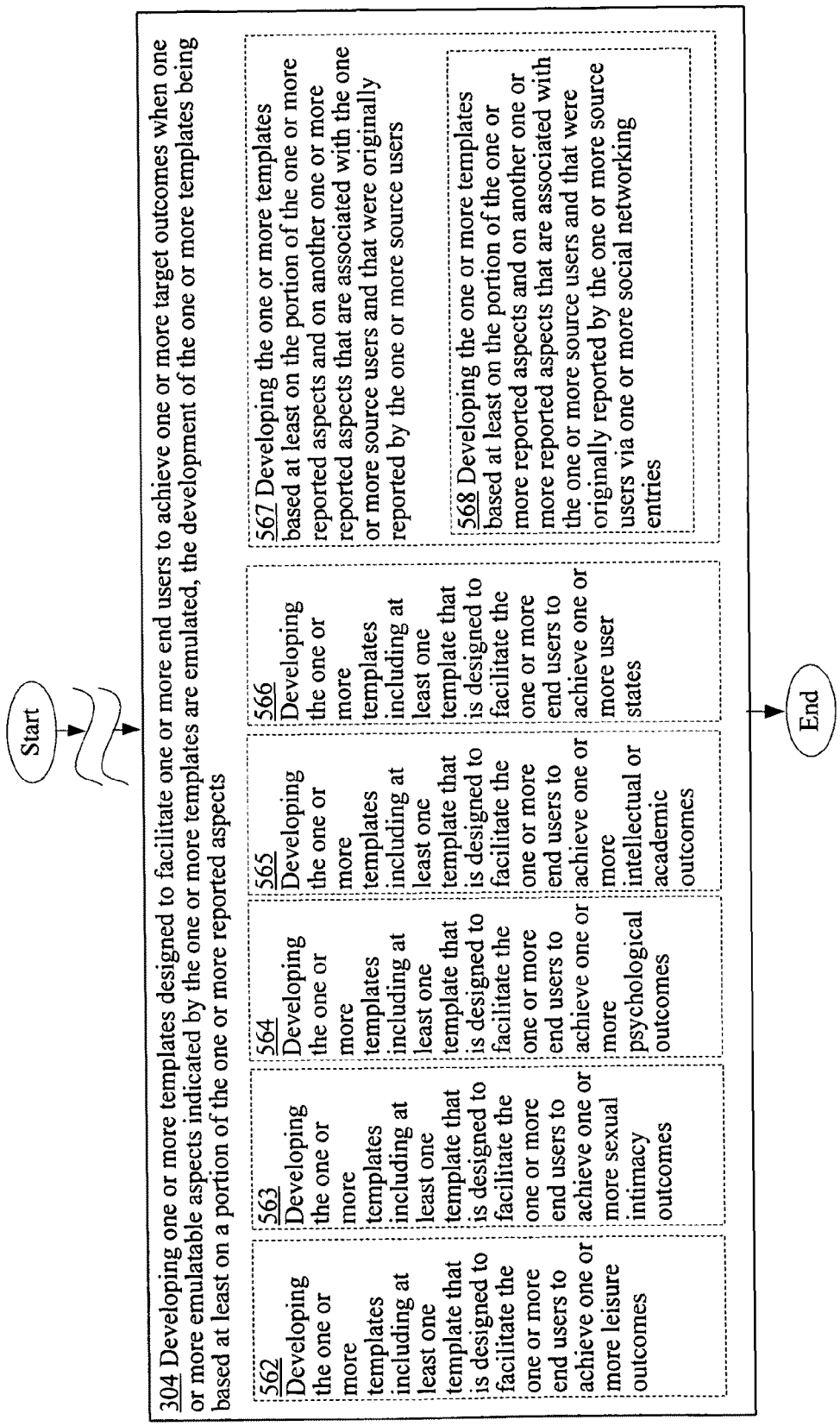
FIG. 5d is a high-level logic flowchart of a process depicting alternate implementations of the template developing operation 304 of FIG. 3.

In the same or different implementations, the template developing operation 304 may include an operation 562 for developing the one or more templates including at least one template that is designed to facilitate the one or more end users to achieve one or more leisure outcomes as depicted in FIG. 5d. For instance, the template development module 104 of the computing device 10 developing the one or more templates 18 including at least one template 18 that is designed to facilitate one or more end users 4* to achieve one or more leisure outcomes (e.g., going to Hawaii on a vacation, setting aside time for a vacation, finish reading a novel, spending time with offspring, and so forth).

In the same or different implementations, the template developing operation 304 may include an operation 563 for developing the one or more templates including at least one template that is designed to facilitate the one or more end users to achieve one or more sexual intimacy outcomes as depicted in FIG. 5d. For instance, the template development module 104 of the computing device 10 developing the one or more templates 18 including at least one template 18 that is designed to facilitate one or more end users 4* to achieve one or more sexual intimacy outcomes (e.g., increase frequency and quality of sexual intimacy encounters).

In the same or different implementations, the template developing operation 304 may include an operation 564 for developing the one or more templates including at least one template that is designed to facilitate the one or more end users to achieve one or more psychological outcomes as depicted in FIG. 5d. For instance, the template development module 104 of the computing device 10 developing the one or more templates 18 including at least one template 18 that is designed to facilitate one or more end users 4* to achieve one or more psychological outcomes (e.g., develop better self-esteem, be cured of a phobia, and so forth).

In the same or different implementations, the template developing operation 304 may include an operation 565 for developing the one or more templates including at least one template that is designed to facilitate the one or more end users to achieve one or more intellectual or academic outcomes as depicted in FIG. 5d. For instance, the template development module 104 of the computing device 10 developing the one or more templates 18 including at least one template 18 that is designed to facilitate one or more end users 4* to achieve one or more intellectual or academic outcomes (e.g., achieve a certain score for a test, graduate or be accepted from a particular school, win a particular academic award, and so forth).

In the same or different implementations, the template developing operation 304 may include an operation 566 for developing the one or more templates including at least one template that is designed to facilitate the one or more end users to achieve one or more user states as depicted in FIG. 5*d*. For instance, the template development module 104 of the computing device 10 developing the one or more templates 18 including at least one template 18 that is designed to facilitate one or more end users 4* to achieve one or more user states (e.g., be content, be relaxed, be focused, and so forth).

In some cases, the template developing operation 304 of FIG. 3 may involve developing one or more templates 18 based on data provided by sensors 240* and data provided by source users 2*. For example, in some implementations, the template developing operation 304 may include an operation 567 for developing the one or more templates based at least on the portion of the one or more reported aspects and on another one or more reported aspects that are associated with the one or more source users and that were originally reported by the one or more source users as depicted in FIG. 5*d*. For instance, the template development module 104 of the computing device 10 developing the one or more templates 18 based at least on the portion of the one or more reported aspects 15 and on another one or more reported aspects 15 that are associated with the one or more source users 2* and that were originally reported by the one or more source users 2*.

In some implementations, operation 567 may further include an operation 568 for developing the one or more templates based at least on the portion of the one or more reported aspects and on another one or more reported aspects that are associated with the one or more source users and that were originally reported by the one or more source users via one or more social networking entries as depicted in FIG. 5*d*. For instance, the template development module 104 of the computing device 10 developing the one or more templates 18 based at least on the portion of the one or more reported aspects 15 and on another one or more reported aspects 15 that are associated with the one or more source users 2* and that were originally reported by the one or more source users 2* via one or more social networking entries (e.g., blog entries such as microblog entries, status reports, and so forth).

Figure 6:
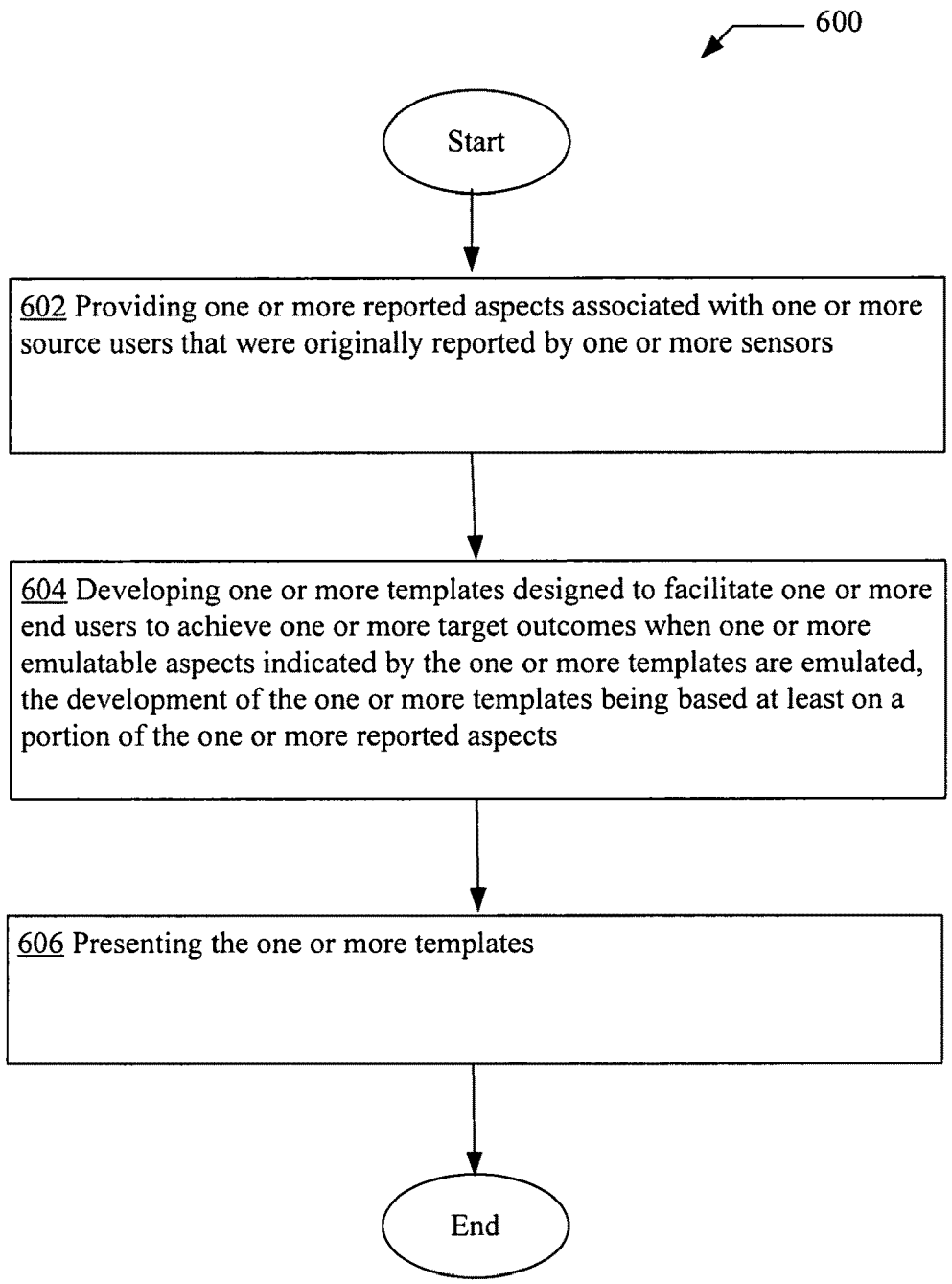
FIG. 6 is a high-level logic flowchart of another process.

Referring to FIG. 6 illustrating another operational flow 600 in accordance with various embodiments. Operational flow 600 includes certain operations that mirror the operations included in the operational flow 300 of FIG. 3. These operations include a sensor originated reported aspect providing operation 602 and a template developing operation 604 that corresponds to and mirror the sensor originated reported aspect providing operation 302 and the template developing operation 304, respectively, of FIG. 3.

In addition, operational flow 300 includes a template presenting operation 606 for presenting the one or more templates as depicted in FIG. 6. For instance, the presentation module 106 of the computing device 10 presenting the one or more templates 18 to one or more end users 4*, to one or more source users 2*, to one or more third parties 6, or to one or more network servers 60.

Figure 7:
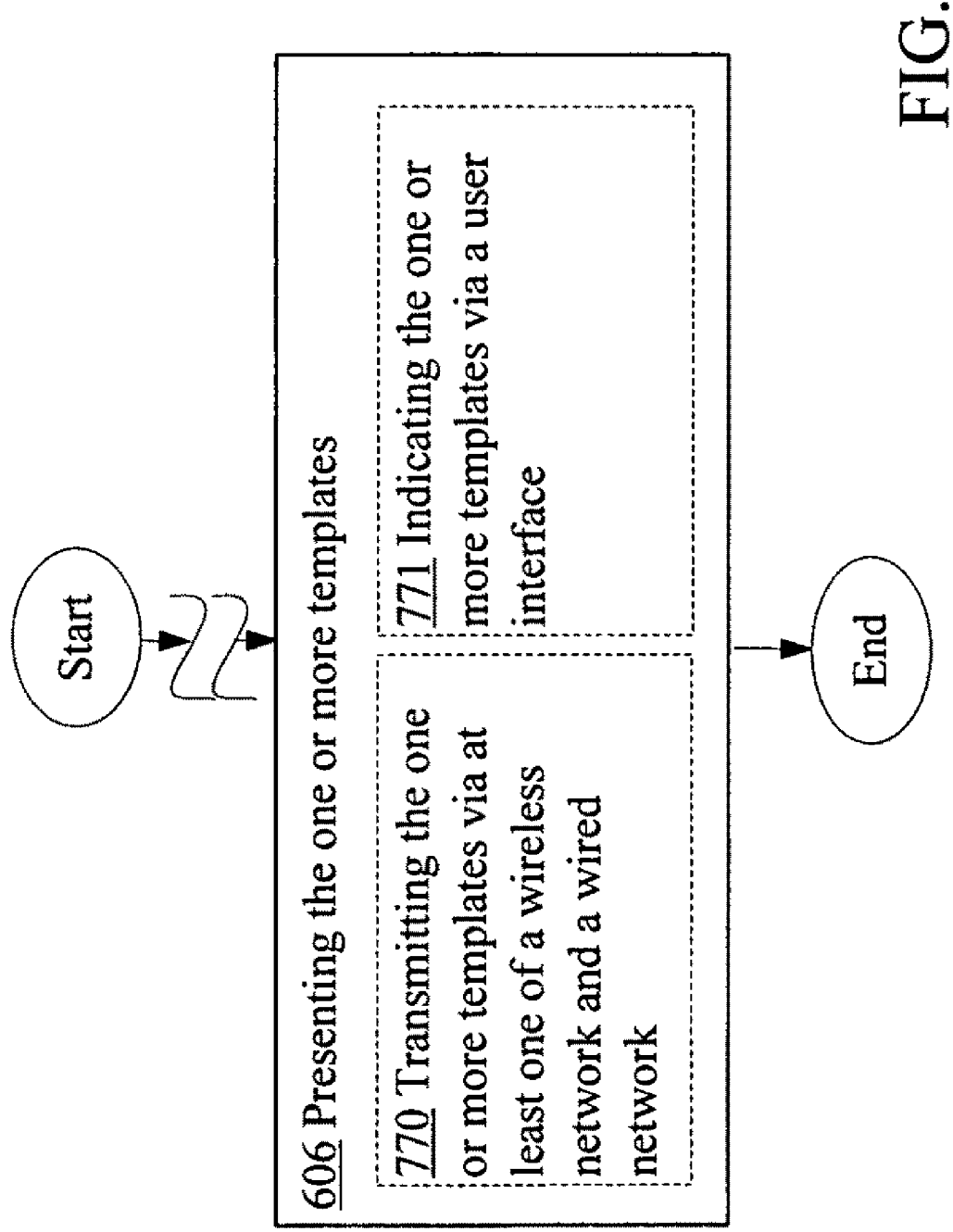
FIG. 7 is a high-level logic flowchart of a process depicting alternate implementations of the presentation operation 606 of FIG. 6.

In some implementations, the template presentation operation 606 may include an operation 770 for transmitting the one or more templates via at least one of a wireless network and a wired network as depicted in FIG. 7. For instance, the transmission module 236 of the computing device 10 transmitting the one or more templates 18 via at least one of a wireless network and a wired network 50.

In the same or different implementations, the template presentation operation 606 may include an operation 771 for indicating the one or more templates via a user interface as depicted in FIG. 7. For instance, the user interface indication module 238 indicating (e.g., displaying or audioally indicating) the one or more templates 18 via a user interface 120 (e.g., a display monitor, a touch screen, and/or one or more audio speakers).

Figure 8:
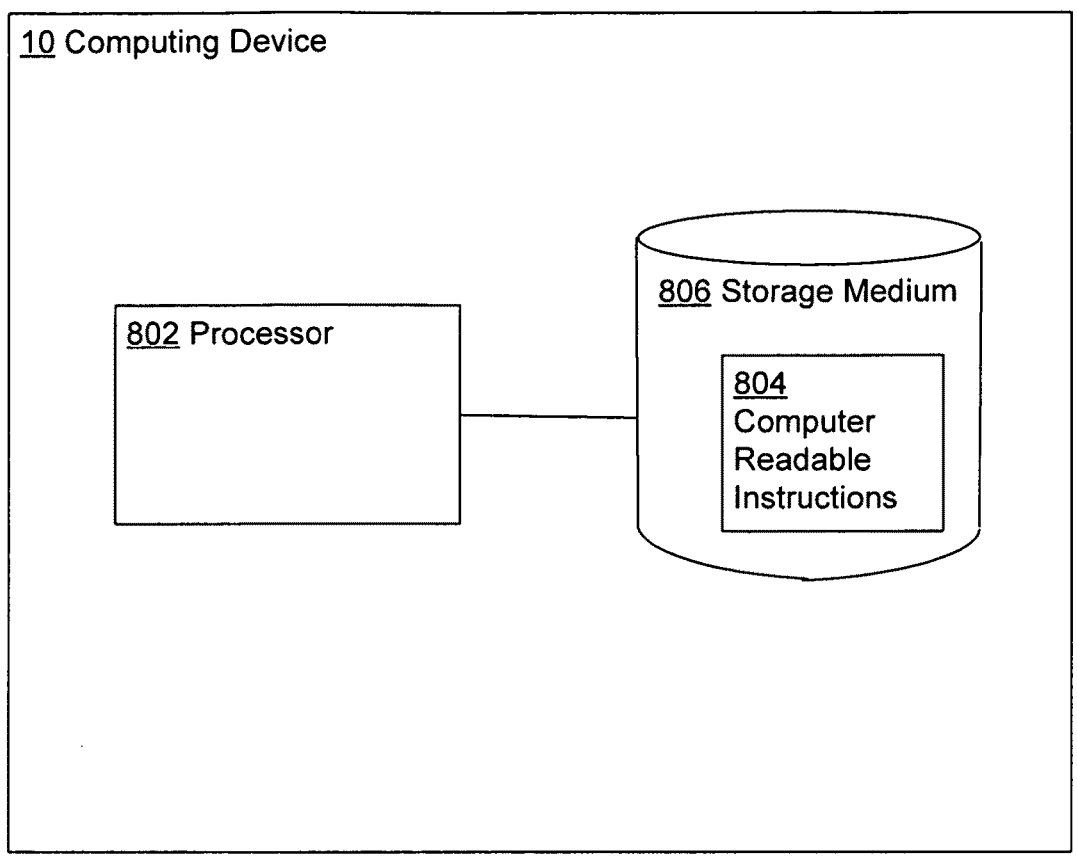
FIG. 8 is another high-level block diagram showing one implementation of the computing device 10 of FIG. 1b.

Turning now to FIG. 8, which is a high-level block diagram illustrating a particular implementation of the computing device 10 of FIG. 1*b*. As illustrated, the computing device 10 may include a processor 802 (e.g., microprocessor, controller, and so forth) coupled to storage medium 806 (e.g., volatile or non-volatile memory). The storage medium 806 may store computer readable instructions 804 (e.g., computer program product). The processor 802, in various implementations, may execute the computer readable instructions 804 in order to execute one or more operations described above and as illustrated in FIGS. 3, 4*a*, 4*b*, 4*c*, 4*d*, 4*e*, 4*f*, 5*a*, 5*b*, 5*c*, and 5*d*.

For example, the processor 802 may execute the computer readable instructions 804 in order to provide one or more reported aspects 15 associated with one or more source users 2* that were originally reported by one or more sensors 240*; and/or to develop one or more templates 18 designed to facilitate one or more end users 4* to achieve one or more target outcomes when one or more emulatable aspects indicated by the one or more templates 18 are emulated, the development of the one or more templates 18 being based at least on a portion of the one or more reported aspects 15 as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system, comprising:
   means for providing one or more reported aspects associated with one or more source users that were originally reported by one or more sensors; and
   means for developing one or more templates designed to facilitate one or more end users to achieve one or more target outcomes when one or more emulatable aspects indicated by the one or more templates are emulated, the development of the one or more templates being based at least on a portion of the one or more reported aspects, wherein said means for developing one or more templates designed to facilitate one or more end users to achieve one or more target outcomes when one or more emulatable aspects indicated by the one or more templates are emulated, the development of the one or more templates being based at least on a portion of the one or more reported aspects, comprises:
      means for including into each of the one or more templates one or more emulatable aspects that correspond to at least the portion of the one or more reported aspects, wherein said means for including into each of the one or more templates one or more emulatable aspects that correspond to at least the portion of the one or more reported aspects, comprises:
         means for determining whether at least one of the one or more emulatable aspects to be included in the one or more templates is a plausible aspect that has been successfully emulated by one or more third parties, and if not plausible, execute one or more actions.

2. The computationally-implemented system of claim 1, wherein said means for determining whether at least one of the one or more emulatable aspects to be included in the one or more templates is a plausible aspect that has been successfully emulated by one or more third parties, and if not plausible, execute one or more actions, comprises:
   means for notifying, in response to determining that the at least one of the one or more emulatable aspects to be included in the one or more templates is not a plausible aspect, at least one of an end user, a source user, or a third party regarding the determination that at least one of the one or more emulatable aspects to be included in the one or more templates is not a plausible aspect.

3. The computationally-implemented system of claim 1, wherein said means for determining whether at least one of the one or more emulatable aspects to be included in the one or more templates is a plausible aspect that has been successfully emulated by one or more third parties, and if not plausible, execute one or more actions, comprises:
   means for modifying, in response to determining that the at least one of the one or more emulatable aspects is not a plausible aspect, at least one of the one or more templates by revising the at least one of the one or more emulatable aspects determined to be not a plausible aspect or by replacing the at least one of the one or more emulatable aspects determined to be not a plausible aspect with at least one replacement emulatable aspect that is a plausible aspect that has been successfully emulated by one or more third parties.

4. The computationally-implemented system of claim 1, wherein said means for determining whether at least one of the one or more emulatable aspects to be included in the one or more templates is a plausible aspect that has been successfully emulated by one or more third parties, and if not plausible, execute one or more actions, comprises:
   means for determining whether at least one of the one or more emulatable aspects to be included in the one or more templates is a plausible aspect that has been successfully emulated by the one or more third parties in order to achieve at least one of the one or more target outcomes, and if not plausible, execute the one or more actions.

5. The computationally-implemented system of claim 1, wherein said means for developing one or more templates designed to facilitate one or more end users to achieve one or more target outcomes when one or more emulatable aspects indicated by the one or more templates are emulated, the development of the one or more templates being based at least on a portion of the one or more reported aspects, comprises:
   means for identifying from the one or more reported aspects one or more relevant reported aspects that were originally reported by the one or more sensors and that are relevant with respect to achieving the one or more target outcomes.

6. The computationally-implemented system of claim 5, wherein said means for identifying from the one or more reported aspects one or more relevant reported aspects that were originally reported by the one or more sensors and that are relevant with respect to achieving the one or more target outcomes, comprises:
   means for identifying from the one or more reported aspects the one or more relevant reported aspects by identifying one or more reported aspects that were originally reported by the one or more sensors and that are associated with one or more source users who have achieved the one or more target outcomes.

7. The computationally-implemented system of claim 6, wherein said means for identifying from the one or more reported aspects the one or more relevant reported aspects by identifying one or more reported aspects that were originally reported by the one or more sensors and that are associated with one or more source users who have achieved the one or more target outcomes, comprises:
   means for identifying from the one or more reported aspects the one or more relevant reported aspects by identifying one or more reported aspects that were originally reported by the one or more sensors and that are relevant with respect to one or more relevancy factors.

8. The computationally-implemented system of claim 7, wherein said means for identifying from the one or more reported aspects the one or more relevant reported aspects by identifying one or more reported aspects that were originally reported by the one or more sensors and that are relevant with respect to one or more relevancy factors, comprises:
means for identifying from the one or more reported aspects the one or more relevant reported aspects by identifying one or more reported aspects that were originally reported by the one or more sensors and that indicate one or more aspects that belong to one or more aspect types that are of interest to the one or more end users.

9. The computationally-implemented system of claim 7, wherein said means for identifying from the one or more reported aspects the one or more relevant reported aspects by identifying one or more reported aspects that were originally reported by the one or more sensors and that are relevant with respect to one or more relevancy factors, comprises:
means for identifying from the one or more reported aspects the one or more relevant reported aspects by identifying one or more reported aspects that were originally reported by the one or more sensors and that indicate one or more aspects that belong to one or more aspect types that have been indicated by at least one source user as being relevant to the achievement of the one or more target outcomes.

10. The computationally-implemented system of claim 7, wherein said means for identifying from the one or more reported aspects the one or more relevant reported aspects by identifying one or more reported aspects that were originally reported by the one or more sensors and that are relevant with respect to one or more relevancy factors, comprises:
means for identifying from the one or more reported aspects the one or more relevant reported aspects by identifying one or more reported aspects that were originally reported by the one or more sensors and that indicate one or more aspects that occurred within one or more predefined time increments, respectively, from one or more achievements of the one or more target outcomes by the one or more source users who have achieved the one or more target outcomes.

11. The computationally-implemented system of claim 1, further comprising:
means for presenting the one or more templates.

12. The computationally-implemented system of claim 1, wherein said means for providing one or more reported aspects associated with one or more source users that were originally reported by one or more sensors, comprises:
means for providing the one or more reported aspects that were originally reported by the one or more sensors including one or more reported aspects that indicate one or more behavior incidences associated with the one or more source users.

13. The computationally-implemented system of claim 12, wherein said means for providing the one or more reported aspects that were originally reported by the one or more sensors including one or more reported aspects that indicate one or more behavior incidences associated with the one or more source users, comprises:
means for providing the one or more reported aspects that were originally reported by the one or more sensors including one or more reported aspects that indicate one or more incidences of activities executed by the one or more source users.

14. The computationally-implemented system of claim 12, wherein said means for providing the one or more reported aspects that were originally reported by the one or more sensors including one or more reported aspects that indicate one or more behavior incidences associated with the one or more source users, comprises:
means for providing the one or more reported aspects that were originally reported by the one or more sensors including one or more reported aspects that indicate one or more user attitudes or conduct associated with the one or more source users.

15. The computationally-implemented system of claim 1, wherein said means for providing one or more reported aspects associated with one or more source users that were originally reported by one or more sensors, comprises:
means for providing the one or more reported aspects that were originally reported by the one or more sensors including one or more reported aspects that indicate one or more incidences of one or more mental states associated with the one or more source users.

16. The computationally-implemented system of claim 1, wherein said means for providing one or more reported aspects associated with one or more source users that were originally reported by one or more sensors, comprises:
means for providing the one or more reported aspects that were originally reported by the one or more sensors including one or more reported aspects that indicate one or more incidences of one or more user physical characteristics associated with the one or more source users.

17. The computationally-implemented system of claim 16, wherein said means for providing the one or more reported aspects that were originally reported by the one or more sensors including one or more reported aspects that indicate one or more incidences of one or more user physical characteristics associated with the one or more source users, comprises:
means for providing the one or more reported aspects that were originally reported by the one or more sensors including one or more reported aspects that indicate one or more incidences of one or more user physiological characteristics associated with the one or more source users.

18. The computationally-implemented system of claim 1, wherein said means for providing one or more reported aspects associated with one or more source users that were originally reported by one or more sensors, comprises:
means for providing the one or more reported aspects that were originally reported by the one or more sensors including one or more reported aspects that indicate one or more incidences of one or more user locations associated with the one or more source users.

19. The computationally-implemented system of claim 1, wherein said means for providing one or more reported aspects associated with one or more source users that were originally reported by one or more sensors, comprises:
means for providing the one or more reported aspects that were originally reported by the one or more sensors including one or more reported aspects that indicate one or more incidences of one or more external events associated with the one or more source users.

20. The computationally-implemented system of claim 1, wherein said means for providing one or more reported aspects associated with one or more source users that were originally reported by one or more sensors, comprises:
means for providing the one or more reported aspects by selectively acquiring one or more relevant reported aspects that were originally reported by the one or more sensors and that are relevant with respect to achieving the one or more target outcomes.

21. The computationally-implemented system of claim 20, wherein said means for providing the one or more reported aspects by selectively acquiring one or more relevant reported aspects that were originally reported by the one or more sensors and that are relevant with respect to achieving the one or more target outcomes, comprises:
  means for acquiring the one or more relevant reported aspects by selectively acquiring one or more reported aspects that were originally reported by the one or more sensors and that are associated with one or more source users who have achieved the one or more target outcomes.

22. The computationally-implemented system of claim 20, wherein said means for providing the one or more reported aspects by selectively acquiring one or more relevant reported aspects that were originally reported by the one or more sensors and that are relevant with respect to achieving the one or more target outcomes, comprises:
  means for acquiring the one or more relevant reported aspects by selectively acquiring one or more reported aspects that were originally reported by the one or more sensors and that are relevant with respect to one or more relevancy factors.

23. The computationally-implemented system of claim 22, wherein said means for acquiring the one or more relevant reported aspects by selectively acquiring one or more reported aspects that were originally reported by the one or more sensors and that are relevant with respect to one or more relevancy factors, comprises:
  means for acquiring the one or more relevant reported aspects by selectively acquiring one or more reported aspects that were originally reported by the one or more sensors and that indicate one or more aspects that belong to one or more aspect types that are of interest to the one or more end users.

24. The computationally-implemented system of claim 22, wherein said means for acquiring the one or more relevant reported aspects by selectively acquiring one or more reported aspects that were originally reported by the one or more sensors and that are relevant with respect to one or more relevancy factors, comprises:
  means for acquiring the one or more relevant reported aspects by selectively acquiring one or more reported aspects that were originally reported by the one or more sensors and that indicate one or more aspects that belong to one or more aspect types that have been indicated by at least one source user as being relevant to the achievement of the one or more target outcomes.

25. The computationally-implemented system of claim 22, wherein said means for acquiring the one or more relevant reported aspects by selectively acquiring one or more reported aspects that were originally reported by the one or more sensors and that are relevant with respect to one or more relevancy factors, comprises:
  means for acquiring the one or more relevant reported aspects by selectively acquiring one or more reported aspects that were originally reported by the one or more sensors and that indicate one or more aspects that occurred within one or more predefined time increments, respectively, from one or more achievements of the one or more target outcomes by the one or more source users who have achieved the one or more target outcomes.

26. The computationally-implemented system of claim 1, wherein said means for providing one or more reported aspects associated with one or more source users that were originally reported by one or more sensors, comprises:
  means for providing one or more reported aspects associated with the one or more source users that were at least originally reported by one or more sensors designed to sense one or more behavior aspects associated with the one or more source users.

27. The computationally-implemented system of claim 26, wherein said means for providing one or more reported aspects associated with the one or more source users that were at least originally reported by one or more sensors designed to sense one or more behavior aspects associated with the one or more source users, comprises:
  means for providing one or more reported aspects associated with the one or more source users that were at least originally reported by the one or more sensors including one or more pedometers.

28. The computationally-implemented system of claim 26, wherein said means for providing one or more reported aspects associated with the one or more source users that were at least originally reported by one or more sensors designed to sense one or more behavior aspects associated with the one or more source users, comprises:
  means for providing one or more reported aspects associated with the one or more source users that were at least originally reported by the one or more sensors including one or more accelerometers.

29. The computationally-implemented system of claim 26, wherein said means for providing one or more reported aspects associated with the one or more source users that were at least originally reported by one or more sensors designed to sense one or more behavior aspects associated with the one or more source users, comprises:
  means for providing one or more reported aspects associated with the one or more source users that were at least originally reported by the one or more sensors including one or more sensors designed to sense usage of one or more exercise equipment.

30. The computationally-implemented system of claim 26, wherein said means for providing one or more reported aspects associated with the one or more source users that were at least originally reported by one or more sensors designed to sense one or more behavior aspects associated with the one or more source users, comprises:
  means for providing one or more reported aspects associated with the one or more source users that were at least originally reported by the one or more sensors including one or more sensors designed to sense usage of one or more transportation vehicles.

31. The computationally-implemented system of claim 26, wherein said means for providing one or more reported aspects associated with the one or more source users that were at least originally reported by one or more sensors designed to sense one or more behavior aspects associated with the one or more source users, comprises:
  means for providing one or more reported aspects associated with the one or more source users that were at least originally reported by the one or more sensors including one or more sensors designed to sense usage of one or more household appliances.

32. The computationally-implemented system of claim 26, wherein said means for providing one or more reported aspects associated with the one or more source users that were at least originally reported by one or more sensors designed to sense one or more behavior aspects associated with the one or more source users, comprises:

means for providing one or more reported aspects associated with the one or more source users that were at least originally reported by the one or more sensors including one or more sensors designed to sense toilet usage.

33. The computationally-implemented system of claim 1, wherein said means for providing one or more reported aspects associated with one or more source users that were originally reported by one or more sensors, comprises:
   means for providing one or more reported aspects associated with the one or more source users that were at least originally reported by the one or more sensors including one or more global positioning systems (GPSs).

34. The computationally-implemented system of claim 1, wherein said means for providing one or more reported aspects associated with one or more source users that were originally reported by one or more sensors, comprises:
   means for providing one or more reported aspects associated with the one or more source users that were at least originally reported by the one or more sensors including one or more sensors designed to sense one or more environmental conditions.

35. The computationally-implemented system of claim 34, wherein said means for providing one or more reported aspects associated with the one or more source users that were at least originally reported by the one or more sensors including one or more sensors designed to sense one or more environmental conditions, comprises:
   means for providing one or more reported aspects associated with the one or more source users that were at least originally reported by the one or more sensors including one or more sensors designed to sense water quality.

36. The computationally-implemented system of claim 34, wherein said means for providing one or more reported aspects associated with the one or more source users that were at least originally reported by the one or more sensors including one or more sensors designed to sense one or more environmental conditions, comprises:
   means for providing one or more reported aspects associated with the one or more source users that were at least originally reported by the one or more sensors including one or more sensors designed to sense air quality.

37. The computationally-implemented system of claim 34, wherein said means for providing one or more reported aspects associated with the one or more source users that were at least originally reported by the one or more sensors including one or more sensors designed to sense one or more environmental conditions, comprises:
   means for providing one or more reported aspects associated with the one or more source users that were at least originally reported by the one or more sensors including one or more sensors designed to sense one or more atmospheric conditions.

38. The computationally-implemented system of claim 37, wherein said means for providing one or more reported aspects associated with the one or more source users that were at least originally reported by the one or more sensors including one or more sensors designed to sense atmospheric conditions, comprises:
   means for providing one or more reported aspects associated with the one or more source users that were at least originally reported by the one or more sensors including at least one of a barometer, a thermometer, or a humidity sensor.

39. The computationally-implemented system of claim 1, wherein said means for providing one or more reported aspects associated with one or more source users that were originally reported by one or more sensors, comprises:
   means for providing one or more reported aspects associated with the one or more source users that were at least originally reported by the one or more sensors including one or more sensors designed to sense one or more physiological characteristics used to determine one or more mental states.

40. The computationally-implemented system of claim 1, wherein said means for providing one or more reported aspects associated with one or more source users that were originally reported by one or more sensors, comprises:
   means for providing one or more reported aspects associated with the one or more source users that were at least originally reported by the one or more sensors and via one or more social networking entries.

41. The computationally-implemented system of claim 40, wherein said means for providing one or more reported aspects associated with the one or more source users that were at least originally reported by the one or more sensors and via one or more social networking entries, comprises:
   means for providing one or more reported aspects associated with the one or more source users that were at least originally reported by the one or more sensors via one or more blog entries.

42. The computationally-implemented system of claim 40, wherein said means for providing one or more reported aspects associated with the one or more source users that were at least originally reported by the one or more sensors and via one or more social networking entries, comprises:
   means for providing one or more reported aspects associated with the one or more source users that were at least originally reported by the one or more sensors via one or more status reports.

43. A method for developing one or more personalized plans, comprising:
   providing one or more reported aspects associated with one or more source users that were originally reported by one or more sensors; and
   developing, using one or more processors, one or more templates designed to facilitate one or more end users to achieve one or more target outcomes when one or more emulatable aspects indicated by the one or more templates are emulated, the development of the one or more templates being based at least on a portion of the one or more reported aspects, wherein said developing, using one or more processors, one or more templates designed to facilitate one or more end users to achieve one or more target outcomes when one or more emulatable aspects indicated by the one or more templates are emulated, the development of the one or more templates being based at least on a portion of the one or more reported aspects comprises:
      including into each of the one or more templates, using the one or more processors, one or more emulatable aspects that correspond to at least the portion of the one or more reported aspects, wherein said including into each of the one or more templates, using the one or more processors, one or more emulatable aspects that correspond to at least the portion of the one or more reported aspects, comprises:
         determining, using the one or more processors, whether at least one of the one or more emulatable aspects to be included in the one or more templates is a plausible aspect that has been successfully emulated by one or more third parties, and if not plausible, execute one or more actions.

* * * * *